(12) United States Patent
Zhang et al.

(10) Patent No.: US 12,367,457 B2
(45) Date of Patent: Jul. 22, 2025

(54) SYSTEMS AND METHODS OF VERIFYING PRICE TAG LABEL-PRODUCT PAIRINGS

(71) Applicant: Walmart Apollo, LLC, Bentonville, AR (US)

(72) Inventors: Lingfeng Zhang, Dallas, TX (US); Wei Wang, Dallas, TX (US); Avinash Madhusudanrao Jade, Bangalore (IN); Raghava Balusu, Achanta (IN); Mingquan Yuan, Flower Mound, TX (US); Jing Wang, Dallas, TX (US); Han Zhang, Allen, TX (US); Zhaoliang Duan, Frisco, TX (US); William Craig Robinson, Jr., Centerton, AR (US); Benjamin R. Ellison, San Francisco, CA (US); Paul Lewis Lobo, Irving, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 224 days.

(21) Appl. No.: 17/983,773

(22) Filed: Nov. 9, 2022

(65) Prior Publication Data
US 2024/0152863 A1    May 9, 2024

(51) Int. Cl.
*G06Q 10/087* (2023.01)
*G06V 20/50* (2022.01)
(Continued)

(52) U.S. Cl.
CPC ........... *G06Q 10/087* (2013.01); *G06V 20/50* (2022.01); *G06V 30/19007* (2022.01); *G06V 30/30* (2022.01)

(58) Field of Classification Search
CPC .................................................. G06Q 10/087
See application file for complete search history.

(56) References Cited

U.S. PATENT DOCUMENTS 5,074,594 A    12/1991    Laganowski
6,570,492 B1    5/2003    Peratoner
(Continued)

FOREIGN PATENT DOCUMENTS

CN        106347550 B      8/2019
CN        110348439 B     10/2019
(Continued)

OTHER PUBLICATIONS

Verma, Nishchal K., et al. "Object identification for inventory management using convolutional neural network." 2016 IEEE Applied Imagery Pattern Recognition Workshop (AIPR). IEEE, 2016. (Year: 2016).*

(Continued)

*Primary Examiner* — Nathan A Mitchell
(74) *Attorney, Agent, or Firm* — Foley IP Law, PLLC

(57) ABSTRACT

Systems and methods of verifying pairings of price tag labels and products at a product storage facility include an image capture device that moves about and captures images of product storage structures at the product storage facility, and a database that stores inventory data associated with the products stocked at the product storage facility. A computing device processes the images to extract one or more characters from the price tag labels and products detected in the images, correlates the extracted characters to the inventory data to identify a product code and a product name that matches the characters extracted from the price tag labels and the products. If the characters extracted from the price tag and from the on-shelf product to which the price tag label is allocated match, the database is updated to reflect that the price tag label is properly allocated to the appropriate on-shelf product.

18 Claims, 8 Drawing Sheets

(51) Int. Cl.
*G06V 30/19* (2022.01)
*G06V 30/30* (2022.01)

(56) References Cited

U.S. PATENT DOCUMENTS

| | | | |
|---|---|---|---|
| 8,630,924 B2 * | 1/2014 | Groenevelt | G06Q 10/087 |
| | | | 283/79 |
| 8,923,650 B2 | 12/2014 | Wexler | |
| 8,965,104 B1 | 2/2015 | Hickman | |
| 9,275,308 B2 | 3/2016 | Szegedy | |
| 9,477,955 B2 | 10/2016 | Goncalves | |
| 9,526,127 B1 | 12/2016 | Taubman | |
| 9,576,310 B2 | 2/2017 | Cancro | |
| 9,659,204 B2 | 5/2017 | Wu | |
| 9,811,754 B2 | 11/2017 | Schwartz | |
| 10,002,344 B2 | 6/2018 | Wu | |
| 10,019,803 B2 | 7/2018 | Venable | |
| 10,032,072 B1 | 7/2018 | Tran | |
| 10,129,524 B2 | 11/2018 | Ng | |
| 10,210,432 B2 | 2/2019 | Pisoni | |
| 10,373,116 B2 | 8/2019 | Medina | |
| 10,572,757 B2 | 2/2020 | Graham | |
| 10,592,854 B2 | 3/2020 | Schwartz | |
| 10,839,452 B1 | 11/2020 | Guo | |
| 10,922,574 B1 | 2/2021 | Tariq | |
| 10,943,278 B2 | 3/2021 | Benkreira | |
| 10,956,711 B2 | 3/2021 | Adato | |
| 10,990,950 B2 | 4/2021 | Garner | |
| 10,991,036 B1 | 4/2021 | Bergstrom | |
| 11,036,949 B2 | 6/2021 | Powell | |
| 11,055,905 B2 | 7/2021 | Tagra | |
| 11,087,272 B2 | 8/2021 | Skaff | |
| 11,151,426 B2 | 10/2021 | Dutta | |
| 11,163,805 B2 | 11/2021 | Arocho | |
| 11,276,034 B2 | 3/2022 | Shah | |
| 11,282,287 B2 | 3/2022 | Gausebeck | |
| 11,295,163 B1 * | 4/2022 | Schoner | G06K 7/1447 |
| 11,308,775 B1 | 4/2022 | Sinha | |
| 11,409,977 B1 | 8/2022 | Glaser | |
| 11,593,755 B2 * | 2/2023 | Bogolea | H04N 25/61 |
| 11,900,653 B1 * | 2/2024 | Schoner | G06V 30/248 |
| 2005/0238465 A1 | 10/2005 | Razumov | |
| 2011/0040427 A1 | 2/2011 | Ben-Tzvi | |
| 2014/0002239 A1 | 1/2014 | Rayner | |
| 2014/0247116 A1 | 9/2014 | Davidson | |
| 2014/0307938 A1 | 10/2014 | Doi | |
| 2015/0363660 A1 | 12/2015 | Vidal | |
| 2016/0203525 A1 | 7/2016 | Hara | |
| 2017/0106738 A1 | 4/2017 | Gillett | |
| 2017/0286773 A1 | 10/2017 | Skaff | |
| 2018/0005176 A1 | 1/2018 | Williams | |
| 2018/0018788 A1 | 1/2018 | Olmstead | |
| 2018/0130119 A1 * | 5/2018 | Korac | G06Q 30/0635 |
| 2018/0197223 A1 | 7/2018 | Grossman | |
| 2018/0260772 A1 | 9/2018 | Chaubard | |
| 2019/0025849 A1 | 1/2019 | Dean | |
| 2019/0034864 A1 * | 1/2019 | Skaff | G06Q 10/087 |
| 2019/0043003 A1 | 2/2019 | Fisher | |
| 2019/0050932 A1 | 2/2019 | Dey | |
| 2019/0087772 A1 | 3/2019 | Medina | |
| 2019/0163698 A1 | 5/2019 | Kwon | |
| 2019/0197561 A1 * | 6/2019 | Adato | G06T 7/73 |
| 2019/0220482 A1 | 7/2019 | Crosby | |
| 2019/0236531 A1 | 8/2019 | Adato | |
| 2019/0354923 A1 * | 11/2019 | Taira | G06V 20/10 |
| 2020/0005225 A1 * | 1/2020 | Chaubard | H04N 23/698 |
| 2020/0184170 A1 * | 6/2020 | Reza | G09F 3/0291 |
| 2020/0246977 A1 | 8/2020 | Swietojanski | |
| 2020/0265494 A1 | 8/2020 | Glaser | |
| 2020/0311659 A1 * | 10/2020 | Yonezawa | G06Q 10/087 |
| 2020/0324976 A1 | 10/2020 | Diehr | |
| 2020/0356813 A1 | 11/2020 | Sharma | |
| 2020/0380226 A1 | 12/2020 | Rodriguez | |
| 2020/0387858 A1 | 12/2020 | Hasan | |
| 2021/0049541 A1 | 2/2021 | Gong | |
| 2021/0049542 A1 | 2/2021 | Dalal | |
| 2021/0142105 A1 | 5/2021 | Siskind | |
| 2021/0150231 A1 | 5/2021 | Kehl | |
| 2021/0158278 A1 * | 5/2021 | Bogolea | G06V 20/36 |
| 2021/0192780 A1 | 6/2021 | Kulkarni | |
| 2021/0216954 A1 | 7/2021 | Chaubard | |
| 2021/0248547 A1 * | 8/2021 | Bizoara | G06Q 30/018 |
| 2021/0272269 A1 | 9/2021 | Suzuki | |
| 2021/0319684 A1 | 10/2021 | Ma | |
| 2021/0342914 A1 | 11/2021 | Dalal | |
| 2021/0365877 A1 * | 11/2021 | Huie | G06Q 30/018 |
| 2021/0400195 A1 | 12/2021 | Adato | |
| 2022/0043547 A1 | 2/2022 | Jahjah | |
| 2022/0051179 A1 | 2/2022 | Savvides | |
| 2022/0058425 A1 | 2/2022 | Savvides | |
| 2022/0067085 A1 | 3/2022 | Nihas | |
| 2022/0114403 A1 | 4/2022 | Shaw | |
| 2022/0114821 A1 | 4/2022 | Arroyo | |
| 2022/0138674 A1 * | 5/2022 | Skaff | G09F 3/204 |
| | | | 705/28 |
| 2022/0138914 A1 | 5/2022 | Wang | |
| 2022/0165074 A1 | 5/2022 | Srivastava | |
| 2022/0222924 A1 | 7/2022 | Pan | |
| 2022/0262008 A1 | 8/2022 | Kidd | |
| 2022/0351233 A1 * | 11/2022 | Momma | G06Q 30/06 |
| 2022/0391825 A1 * | 12/2022 | Bogolea | H04N 25/615 |
| 2023/0206274 A1 * | 6/2023 | Lindered | G06Q 30/0238 |
| | | | 705/14.38 |
| 2023/0376893 A1 * | 11/2023 | Bogolea | G05D 1/0274 |

FOREIGN PATENT DOCUMENTS

| | | |
|---|---|---|
| CN | 110443298 B | 2/2022 |
| CN | 114898358 A | 8/2022 |
| EP | 3217324 A1 | 9/2017 |
| EP | 3437031 | 2/2019 |
| EP | 3479298 | 5/2019 |
| WO | 2006113281 A2 | 10/2006 |
| WO | 2017201490 A1 | 11/2017 |
| WO | 2018093796 | 5/2018 |
| WO | 2020051213 A1 | 3/2020 |
| WO | 2021186176 A1 | 9/2021 |
| WO | 2021247420 A2 | 12/2021 |

OTHER PUBLICATIONS

Higa, Kyota, and Kota Iwamoto. "Robust shelf monitoring using supervised learning for improving on-shelf availability in retail stores." Sensors 19.12 (2019): 2722. (Year: 2019).*
Paolanti, Marina, et al. "Mobile robot for retail surveying and inventory using visual and textual analysis of monocular pictures based on deep learning." 2017 European conference on mobile robots (ECMR). IEEE, 2017. (Year: 2017).*
U.S. Appl. No. 17/963,751, filed Oct. 11, 2022, Yilun Chen.
U.S. Appl. No. 17/963,787, filed Oct. 11, 2022, Lingfeng Zhang.
U.S. Appl. No. 17/963,802, filed Oct. 11, 2022, Lingfeng Zhang.
U.S. Appl. No. 17/963,903, filed Oct. 11, 2022, Raghava Balusu.
U.S. Appl. No. 17/966,580, filed Oct. 14, 2022, Paarvendhan Puviyarasu.
U.S. Appl. No. 17/971,350, filed Oct. 21, 2022, Jing Wang.
U.S. Appl. No. 18/102,999, filed Jan. 30, 2023, Han Zhang.
U.S. Appl. No. 18/103,338, filed Jan. 30, 2023, Wei Wang.
U.S. Appl. No. 18/158,925, filed Jan. 24, 2023, Raghava Balusu.
U.S. Appl. No. 18/158,950, filed Jan. 24, 2023, Ishan Arora.
U.S. Appl. No. 18/158,969, filed Jan. 24, 2023, Zhaoliang Duan.
U.S. Appl. No. 18/158,983, filed Jan. 24, 2023, Ashlin Ghosh.
U.S. Appl. No. 18/161,788, filed Jan. 30, 2023, Raghava Balusu.
Chaudhuri, Abon et al.; "A Smart System for Selection of Optimal Product Images in E-Commerce"; 2018 IEEE Conference on Big Data (Big Data); Dec. 10-13, 2018; IEEE; < https://ieeexplore.ieee.org/document/8622259>; pp. 1728-1736.
Chenze, Brandon et al.; "Iterative Approach for Novel Entity Recognition of Foods in Social Media Messages"; 2022 IEEE 23rd International Conference on Information Reuse and Integration for

(56) References Cited

OTHER PUBLICATIONS

Data Science (IRI); Aug. 9-11, 2022; IEEE; <https://ieeexplore.ieee.org/document/9874231>; pp. 126-131.

Naver Engineering Team; "Auto-classification of Naver Shopping Product Categories using TensorFlow"; <https://blog.tensorflow.org/2019/05/auto-classification-of-naver-shopping.html>; May 20, 2019; pp. 1-13.

Paolanti, Marine et al.; "Mobile robot for retail surveying and inventory using visual and textual analysis of monocular pictures based on deep learning"; European Conference on Mobile Robots; Sep. 2017, 6 pages.

Ramanpreet Kaur et al.; "A Brief Review on Image Stitching and Panorama Creation Methods"; International Journal of Control Theory and Applications; 2017; vol. 10, No. 28; International Science Press; Gurgaon, India; <https://www.researchgate.net/publication/348232877 >; 11 pages.

Refills; "Final 3D object perception and localization"; European Commision, Dec. 31, 2016, 16 pages.

Retech Labs; "Storx | RetechLabs"; <https://retechlabs.com/storx/>; available at least as early as Jun. 22, 2019; retrieved from Internet Archive Wayback Machine <https://web.archive.org/web/20190622012152/https://retechlabs.com/storx/> on Dec. 1, 2022; pp. 1-4.

Schroff, Florian et al.; "Facenet: a unified embedding for face recognition and clustering"; 2015 IEEE Conference on Computer Vision and Pattern Recognition (CVPR); Jun. 7-12, 2015; IEEE; <https://ieeexplore.ieee.org/document/7298682>; pp. 815-823.

Singh, Ankit; "Automated Retail Shelf Monitoring Using AI"; <https://blog.paralleldots.com/shelf-monitoring/automated-retail-shelf-monitoring-using-ai/>; Sep. 20, 2019; pp. 1-12.

Singh, Ankit; "Image Recognition and Object Detection in Retail"; <https://blog.paralleldots.com/featured/image-recognition-and-object-detection-in-retail/>; Sep. 26, 2019; pp. 1-11.

Tan, Mingxing et al.; "EfficientDet: Scalable and Efficient Object Detection"; 2020 IEEE/CVF Conference on Computer Vision and Pattern Recognition (CVPR); Jun. 13-19, 2020; IEEE; <https://ieeexplore.ieee.org/document/9156454>; pp. 10778-10787.

Tan, Mingxing et al.; "EfficientNet: Rethinking Model Scaling for Convolutional Neural Networks"; Proceedings of the 36th International Conference on Machine Learning; 2019; vol. 97; PLMR; <http://proceedings.mlr.press/v97/tan19a.html>; pp. 6105-6114.

Technology Robotix Society; "Colour Detection"; <https://medium.com/image-processing-in-robotics/colour-detection-e15bc03b3f61>; Jul. 2, 2019; pp. 1-8.

Tonioni, Alessio et al.; "A deep learning pipeline for product recognition on store shelves"; 2018 IEEE International Conference on Image Processing, Applications and Systems (IPAS); Dec. 12-14, 2018; IEEE; <https://ieeexplore.ieee.org/document/8708890>; pp. 25-31.

Trax Retail; "Image Recognition Technology for Retail | Trax"; <https://traxretail.com/retail/>; available at least as early as Apr. 20, 2021; retrieved from Internet Wayback Machine <https://web.archive.org/web/20210420132348/https://traxretail.com/retail/> on Dec. 1, 2022; pp. 1-19.

Verma, Nishchal et al.; "Object identification for inventory management using convolutional neural network"; IEEE Applied Imagery Pattern Recognition Workshop (AIPR); Oct. 2016, 6 pages.

* cited by examiner

missing content …

SYSTEMS AND METHODS OF VERIFYING PRICE TAG LABEL-PRODUCT PAIRINGS

TECHNICAL FIELD

This disclosure relates generally to managing inventory at product storage facilities, and in particular, to verifying pairings of price tag labels with products at a product storage facility.

BACKGROUND

A typical product storage facility (e.g., a retail store, a product distribution center, a warehouse, etc.) may have hundreds of shelves and thousands of products stored on the shelves and/or on pallets. Individual products offered for sale to consumers are typically stocked on shelves, pallets, and/or each other in a product storage space having a price tag label assigned thereto. It is common for workers of such product storage facilities to manually (e.g., visually) inspect product display shelves and other product storage spaces to verify whether the on-shelf products are properly labeled with appropriate price tag labels.

Given the very large number of product storage areas such as shelves, pallets, and other product displays at product storage facilities of large retailers, and the even larger number of products stored in the product storage areas, manual inspection of the price tag labels and the products on the shelves/pallets by the workers is very time consuming and significantly increases the operations cost for a retailer, since these workers could be performing other tasks if they were not involved in manually inspecting the product storage areas, price tag labels, and products.

BRIEF DESCRIPTION OF THE DRAWINGS

Disclosed herein are embodiments of verifying pairings of on-shelf price tag labels and products at a product storage facility. This description includes drawings, wherein.

Figure 1:
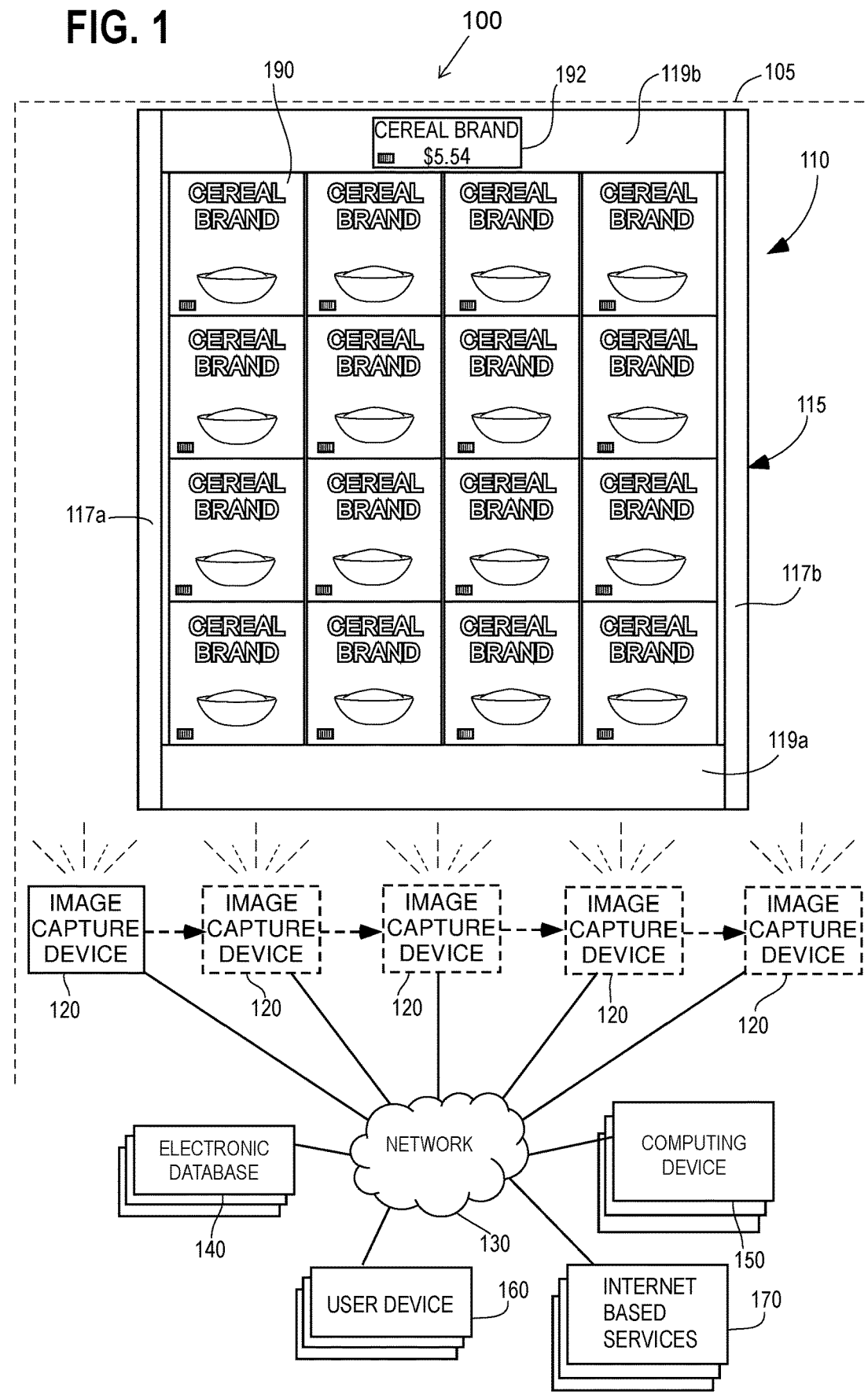
FIG. 1 is a diagram of an exemplary system of verifying pairings of on-shelf price tag labels and on-shelf products at a product storage facility in accordance with some embodiments, depicting a front view of a product storage structure storing exemplary identical individual products having a price tag label associated therewith that is being monitored by an image capture device that is configured to move about the product storage facility.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required.

The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, systems and methods of verifying pairings of price tag labels and products at a product storage facility include an image capture device that moves about and captures images of product storage structures at the product storage facility, and a database that stores inventory data associated with the products stocked at the product storage facility. A computing device processes the images to extract one or more characters from the price tag labels and products detected in the images, correlates the extracted characters to the inventory data to identify a product code and a product name that matches the characters extracted from the price tag labels and the products. If the characters extracted from the price tag and from the on-shelf product to which the price tag label is allocated match, the database is updated to reflect that the price tag label is properly allocated to the appropriate on-shelf product.

In some embodiments, a system for verifying pairings of on-shelf tag labels and products at a product storage facility includes an electronic database configured to store inventory data including product codes and product names associated with the products that are stocked at the product storage facility, an image capture device having a field of view that includes a product storage structure at the product storage facility having the products arranged thereon and configured to capture at least one image of the product storage structure, as well as a computing device including a control circuit, the computing device being communicatively coupled to the image capture device. The control circuit of the computing device is configured to: extract one or more characters from each of price tag labels detected in the at least one image captured by the image capture device and from each of the products detected in the at least one image; correlate the characters extracted from a first one of the price tag labels detected in the image to the inventory data stored in the electronic database to identify a product code that matches the characters extracted from the first one of the price tag labels; correlate the characters extracted from a first one of the products detected in the at least one image to the inventory data stored in the electronic database to identify a product name that matches the characters extracted from the first one of the products; and based on a determination that the product code that matches the characters extracted from the first one of the price tag labels presents a match to the product name that matches the characters extracted from the first one of the products, transmit a first signal to the electronic database to update the electronic database to indicate that the first one of the price tag labels is properly allocated on the product storage structure to the first one of the products.

In some embodiments, a method of analyzing pairings of on-shelf labels and products at a product storage facility includes; storing, in an electronic database, inventory data including product codes and product names associated with the products that are stocked at the product storage facility; capturing, via an image capture device, at least one image of a product storage structure at the product storage facility having the products arranged thereon; obtaining, by a computing device including a control circuit and communicatively coupled to the image capture device, the at least one image of the product storage structure captured by the image capture device. The method further includes processing the obtained at least one image to: extract one or more characters from each of the price tag labels detected in the at least one image and from each of the products detected in the at least one image; correlate the characters extracted from a first one of the price tag labels detected in the image to the inventory data stored in the electronic database to identify a product code that matches the characters extracted from the first one of the price tag labels; correlate the characters extracted from a first one of the products detected in the at least one image to the inventory data stored in the electronic database to identify a product name that matches the characters extracted from the first one of the products; and based on a determination that the product code that matches the characters extracted from the first one of the price tag labels presents a match to the product name that matches the characters extracted from the first one of the products, transmitting a first signal to the electronic database to update the electronic database to indicate that the first one of the price tag labels is properly allocated on the product storage structure to the first one of the products.

FIG. 1 shows an embodiment of a system 100 of analyzing pairings of on-shelf price tag labels 192 and on-shelf products 190 at a product storage facility 105 (which may be a retail store, a product distribution center, a warehouse, etc.). The system 100 is illustrated in FIG. 1 for simplicity with only one movable image capture device 120 that moves about one product storage area 110 containing one product storage structure 115, but it will be appreciated that, depending on the size of the product storage facility 105 being monitored, the system 100 may include multiple movable image capture devices 120 located throughout the product storage facility 105 that monitor hundreds of product storage areas 110 of and thousands of product storage structures 115. It is understood the direction and type of movement of the image capture device 120 about the product storage area 110 of the product storage facility 105 may depend on the physical arrangement of the product storage area 110 and/or the size and shape of the product storage structure 115. For example, the image capture device 120 may move linearly down an aisle alongside a product storage structure 115 (e.g., a shelving unit) located in a product storage area 110 of a product storage facility 105, or may move in a circular fashion around a table having curved/multiple sides. Notably, while the price tag label 192 is referred to herein as an "on-shelf price tag label," it will be appreciated that the price tag label 192 does not necessarily have to be affixed to horizontal support members 119a or 119b (which may be shelves, etc.) of the product support structure 115 as shown in FIG. 1 and may be located in a different location (e.g., on the vertical support members 117a-117b (which may be support posts interconnecting the shelves).

Notably, the term "product storage structure" as used herein generally refers to a structure on which the products 190 are stored, and may include a pallet, a shelf cabinet, a single shelf, table, rack, refrigerator, freezer, displays, bins, gondola, case, countertop, or another product display. Likewise, it will be appreciated that the number (e.g., 16 shown in FIG. 1) of individual products 190 representing individual units of an identical product (generically labeled as "Cereal Brand" in FIG. 1, but may be any other retail product that is stocked on shelves of a product storage facility) is chosen for simplicity and by way of example only, and that the product storage structure 115 may store any number of units of product 190 thereon. Further, the size and shape of the products 190 in FIG. 1 have been shown by way of example only, and it will be appreciated that the individual products 190 may be of various sizes and shapes. Notably, the term "products" may refer to individual product 190 (some of which may be single-piece/single-component products and some of which may be multi-piece/multi-component products), as well as to packages or containers of the product 190, which may be plastic- or paper-based packaging that includes multiple units of a given product 190 (e.g., a plastic wrap that includes 36 rolls of identical paper towels, a paper box that includes 10 packs of identical diapers, etc.). Alternatively, the packaging of the individual products 190 may be a plastic- or paper-based container that encloses one individual product 190 (e.g., a box of cereal as shown in FIG. 1, a bottle of shampoo, etc.).

The image capture device 120 (also referred to as an image capture unit) of the exemplary system 100 depicted in FIG. 1 is configured for movement about the product storage facility 105 (e.g., on the floor via a motorized or non-motorized wheel-based and/or track-based locomotion system, or via slidable tracks above the floor, etc.) such that, when moving (e.g., about an aisle or other area of a product storage facility 105), the image capture device 120 is has a field of view that includes at least a portion the product storage structure 115 within the product storage area 110 of the product storage facility 105, permitting the image capture device 120 to capture multiple images of the product storage area 110 and the product storage structure 115 from various viewing angles. In some embodiments, the image capture device 120 is configured as robotic device that moves without being physically operated/manipulated by a human operator (as described in more detail below). In other embodiments, the image capture device 120 is configured to be driven or manually pushed (e.g., like a cart or the like) by a human operator. In still further embodiments, the image capture device 120 may be a hand-held or a wearable device (e.g., a camera, phone, tablet, or the like) that may be carried and/or work by a worker at the product storage facility 105 while the worker moves about the product storage facility 105. In some embodiments, the image capture device 120 may be incorporated into another mobile device (e.g., a floor cleaner, floor sweeper, forklift, etc.), the primary purpose of which is independent of capturing images of product storage areas 110 of the product storage facility 105.

In some embodiments, as will be described in more detail below, the images of the product storage area 110 captured by the image capture device 120 while moving about the product storage area are transmitted by the image capture device 120 over a network 130 to an electronic database 140 and/or to a computing device 150. In some aspects, the computing device 150 (or a separate image processing internet based/cloud-based service module) is configured to process such images as will be described in more detail below.

The exemplary system 100 includes an electronic database 140. Generally, the exemplary electronic database 140 of FIG. 1 may be configured as a single database, or a collection of multiple communicatively connected databases (e.g., digital image database, meta data database, inventory database, pricing database, customer database, vendor database, manufacturer database, etc.) and is configured to store various raw and processed images (e.g., 180, 182) of the product storage area 110 captured by the image capture device 120 while the image capture device 120 is moving about the product storage facility 105. In some embodiments, the electronic database 140 and the computing device 150 may be implemented as two separate physical devices located at the product storage facility 105. It will be appreciated, however, that the computing device 150 and the electronic database 140 may be implemented as a single physical device and/or may be located at different (e.g., remote) locations relative to each other and relative to the product storage facility 105. In some aspects, the electronic database 140 may be stored, for example, on non-volatile storage media (e.g., a hard drive, flash drive, or removable optical disk) internal or external to the computing device 150, or internal or external to computing devices distinct from the computing device 150. In some embodiments, the electronic database 140 may be cloud-based.

The system 100 of FIG. 1 further includes a computing device 150 (which may be one or more computing devices as pointed out below) configured to communicate with the electronic database 140 (which may be one or more databases as pointed out below), the image capture device 120, user device 160 (which may be one or more user devices as pointed out below), and/or internet-based service 170 (which may be one or more internet-based services as pointed out below) over the network 130. The exemplary network 130 depicted in FIG. 1 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 may include cloud-based features, such as cloud-based memory storage. In some embodiments, the one or more computing devices 150, one or more electronic databases 140, one or more user devices 160, and/or portions of the network 130 are located at, or in the product storage facility 105.

The computing device 150 may be a stationary or portable electronic device, for example, a desktop computer, a laptop computer, a single server or a series of communicatively connected servers, a tablet, a mobile phone, or any other electronic device including a control circuit (i.e., control unit) that includes a programmable processor. The computing device 150 may be configured for data entry and processing as well as for communication with other devices of system 100 via the network 130. As mentioned above, the computing device 150 may be located at the same physical location as the electronic database 140, or may be located at a remote physical location relative to the electronic database 140.

Figure 2:
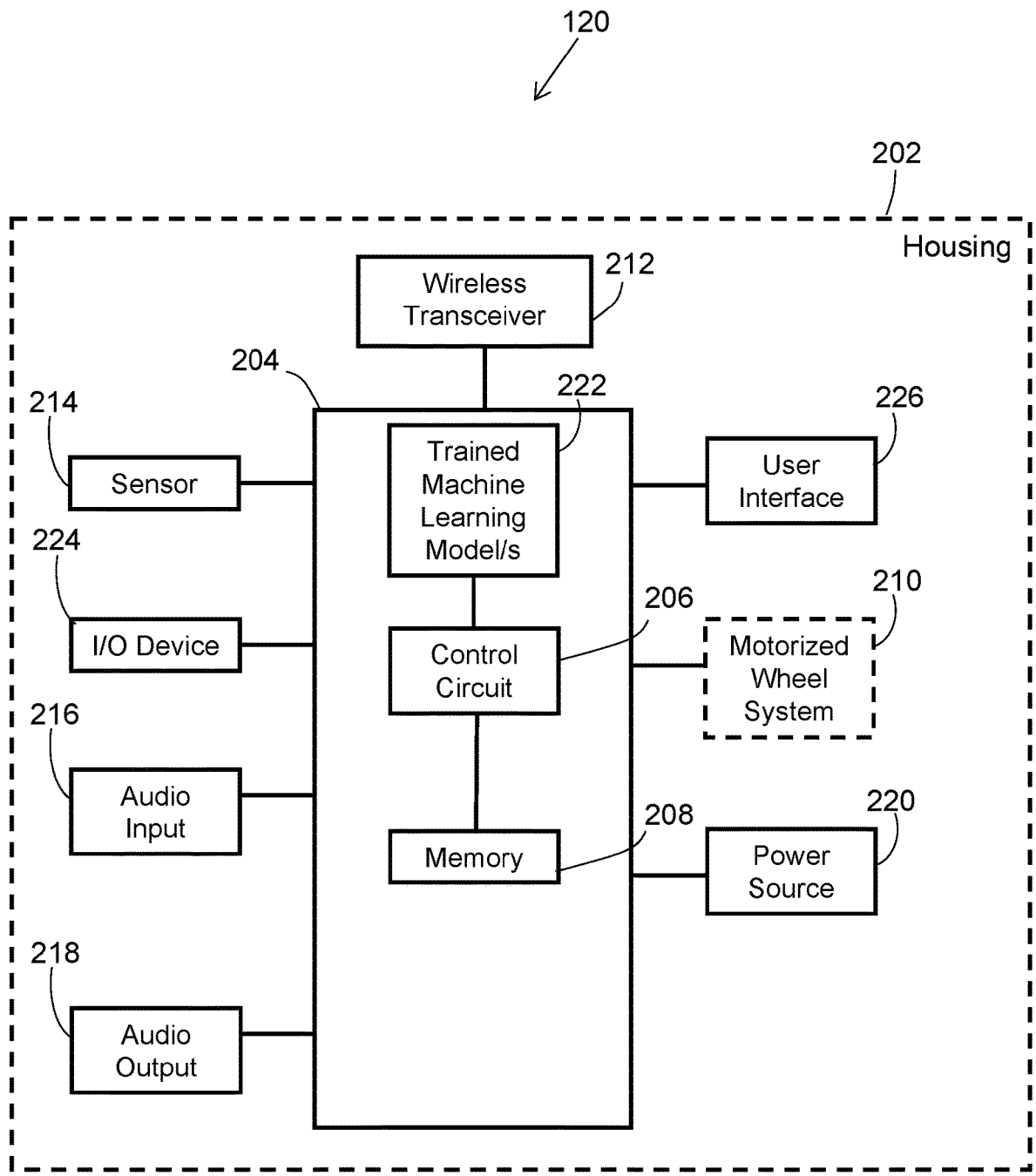
FIG. 2 comprises a block diagram of an exemplary image capture device in accordance with some embodiments.

FIG. 2 presents a more detailed example of an exemplary motorized robotic unit or image capture device 120. As mentioned above, the image capture device 102 does not necessarily need an autonomous motorized wheel-based and/or track-based system to move about the product storage facility 105, and may instead be moved (e.g., driven, pushed, carried, worn, etc.) by a human operator, or may be movably coupled to a track system (which may be above the floor level or at the floor level) that permits the image capture device 120 to move about the product storage facility 105 while capturing images of various product storage areas 110 of the product storage facility 105. In the example shown in FIG. 2, the motorized image capture device 120 has a housing 202 that contains (partially or fully) or at least supports and carries a number of components. These components include a control unit 204 comprising a control circuit 206 that controls the general operations of the motorized image capture device 120 (notably, in some implementations, the control circuit 310 of the computing device 150 may control the general operations of the image capture device 120). Accordingly, the control unit 204 also includes a memory 208 coupled to the control circuit 206 and that stores, for example, computer program code, operating instructions and/or useful data, which when executed by the control circuit implement the operations of the image capture device.

The control circuit 206 of the exemplary motorized image capture device 120 of FIG. 2, operably couples to a motorized wheel system 210, which, as pointed out above, is optional (and for this reason represented by way of dashed lines in FIG. 2). This motorized wheel system 210 functions as a locomotion system to permit the image capture device 120 to move within the product storage facility 105 (thus, the motorized wheel system 210 may be more generically referred to as a locomotion system). Generally, this motorized wheel system 210 may include at least one drive wheel (i.e., a wheel that rotates about a horizontal axis) under power to thereby cause the image capture device 120 to move through interaction with, e.g., the floor of the product storage facility 105. The motorized wheel system 210 can include any number of rotating wheels and/or other alternative floor-contacting mechanisms (e.g., tracks, etc.) as may be desired and/or appropriate to the application setting.

The motorized wheel system 210 may also include a steering mechanism of choice. One simple example may comprise one or more wheels that can swivel about a vertical axis to thereby cause the moving image capture device 120 to turn as well. It should be appreciated that the motorized wheel system 210 may be any suitable motorized wheel and track system known in the art capable of permitting the image capture device 120 to move within the product storage facility 105. Further elaboration in these regards is not provided here for the sake of brevity save to note that the aforementioned control circuit 206 is configured to control the various operating states of the motorized wheel system 210 to thereby control when and how the motorized wheel system 210 operates.

In the exemplary embodiment of FIG. 2, the control circuit 206 operably couples to at least one wireless transceiver 212 that operates according to any known wireless protocol. This wireless transceiver 212 can comprise, for example, a Wi-Fi-compatible and/or Bluetooth-compatible transceiver (or any other transceiver operating according to known wireless protocols) that can wirelessly communicate with the aforementioned computing device 150 via the aforementioned network 130 of the product storage facility 105. So configured, the control circuit 206 of the image capture device 120 can provide information to the computing device 150 (via the network 130) and can receive information and/or movement instructions from computing device 150. For example, the control circuit 206 can receive instructions from the computing device 150 via the network 130 regarding directional movement (e.g., specific predetermined routes of movement) of the image capture device 120 throughout the space of the product storage facility 105. These teachings will accommodate using any of a wide variety of wireless technologies as desired and/or as may be appropriate in a given application setting. These teachings will also accommodate employing two or more different wireless transceivers 212, if desired.

In the embodiment illustrated in FIG. 2, the control circuit 206 also couples to one or more on-board sensors 214 of the image capture device 120. These teachings will accommodate a wide variety of sensor technologies and form factors. According to some embodiments, the image capture device 120 can include one or more sensors 214 including but not limited to an optical sensor, a photo sensor, an infrared sensor, a 3-D sensor, a depth sensor, a digital camera sensor, a laser imaging, detection, and ranging (LIDAR) sensor, a mobile electronic device (e.g., a cell phone, tablet, or the like), a quick response (QR) code sensor, a radio frequency identification (RFID) sensor, a near field communication (NFC) sensor, a stock keeping unit (SKU) sensor, a barcode (e.g., electronic product code (EPC), universal product code (UPC), European article number (EAN), global trade item number (GTIN)) sensor, or the like.

By one optional approach, an audio input 216 (such as a microphone) and/or an audio output 218 (such as a speaker) can also operably couple to the control circuit 206. So configured, the control circuit 206 can provide a variety of audible sounds to thereby communicate with workers at the product storage facility 105 or other motorized image capture devices 120 moving about the product storage facility 105. These audible sounds can include any of a variety of tones and other non-verbal sounds. Such audible sounds can also include, in lieu of the foregoing or in combination therewith, pre-recorded or synthesized speech.

The audio input 216, in turn, provides a mechanism whereby, for example, a user (e.g., a worker at the product storage facility 105) provides verbal input to the control circuit 206. That verbal input can comprise, for example, instructions, inquiries, or information. So configured, a user can provide, for example, an instruction and/or query (e.g., where is product storage structure number so-and-so?, how many products are stocked on product storage structure so-and-so? etc.) to the control circuit 206 via the audio input 216.

In the embodiment illustrated in FIG. 2, the motorized image capture device 120 includes a rechargeable power source 220 such as one or more batteries. The power provided by the rechargeable power source 220 can be made available to whichever components of the motorized image capture device 120 require electrical energy. By one approach, the motorized image capture device 120 includes a plug or other electrically conductive interface that the control circuit 206 can utilize to automatically connect to an external source of electrical energy to thereby recharge the rechargeable power source 220.

In some embodiments, the motorized image capture device 120 includes an input/output (I/O) device 224 that is coupled to the control circuit 206. The I/O device 224 allows an external device to couple to the control unit 204. The function and purpose of connecting devices will depend on the application. In some examples, devices connecting to the I/O device 224 may add functionality to the control unit 204, allow the exporting of data from the control unit 206, allow the diagnosing of the motorized image capture device 120, and so on.

In some embodiments, the motorized image capture device 120 includes a user interface 226 including for example, user inputs and/or user outputs or displays depending on the intended interaction with the user (e.g., worker at the product storage facility 105). For example, user inputs could include any input device such as buttons, knobs, switches, touch sensitive surfaces or display screens, and so on. Example user outputs include lights, display screens, and so on. The user interface 226 may work together with or separate from any user interface implemented at an optional user interface unit or user device 160 (such as a smart phone or tablet device) usable by a worker at the product storage facility 105. In some embodiments, the user interface 226 is separate from the image capture device 120, e.g., in a separate housing or device wired or wirelessly coupled to the image capture device 120. In some embodiments, the user interface 226 may be implemented in a mobile user device 160 carried by a person (e.g., worker at product storage facility 105) and configured for communication over the network 130 with the image capture device 120.

In some embodiments, the motorized image capture device 120 may be controlled by the computing device 150 or a user (e.g., by driving or pushing the image capture device 120 or sending control signals to the image capture device 120 via the user device 160) on-site at the product storage facility 105 or off-site. This is due to the architecture of some embodiments where the computing device 150 and/or user device 160 outputs the control signals to the motorized image capture device 120. These controls signals can originate at any electronic device in communication with the computing device 150 and/or motorized image capture device 120. For example, the movement signals sent to the motorized image capture device 120 may be movement instructions determined by the computing device 150; commands received at the user device 160 from a user; and commands received at the computing device 150 from a remote user not located at the product storage facility 105.

In the embodiment illustrated in FIG. 2, the control unit 204 includes a memory 208 coupled to the control circuit 206 and that stores, for example, computer program code, operating instructions and/or useful data, which when executed by the control circuit implement the operations of the image capture device. The control circuit 206 can comprise a fixed-purpose hard-wired platform or can comprise a partially or wholly programmable platform. These architectural options are well known and understood in the art and require no further description here. This control circuit 206 is configured (for example, by using corresponding programming stored in the memory 208 as will be well understood by those skilled in the art) to carry out one or more of the steps, actions, and/or functions described herein. The memory 208 may be integral to the control circuit 206 or can be physically discrete (in whole or in part) from the control circuit 206 as desired. This memory 208 can also be local with respect to the control circuit 206 (where, for example, both share a common circuit board, chassis, power supply, and/or housing) or can be partially or wholly remote with respect to the control circuit 206. This memory 208 can serve, for example, to non-transitorily store the computer instructions that, when executed by the control circuit 206, cause the control circuit 206 to behave as described herein.

In some embodiments, the control circuit 206 may be communicatively coupled to one or more trained computer vision/machine learning/neural network modules/models 222 to perform at some of the functions. For example, the control circuit 310 may be trained to process one or more images 180 of product storage areas 110 at the product storage facility 105 to detect and/or recognize one or more products 190 using one or more machine learning algorithms, including but not limited to Linear Regression, Logistic Regression, Decision Tree, SVM, Naïve Bayes, kNN, K-Means, Random Forest, Dimensionality Reduction Algorithms, and Gradient Boosting Algorithms. In some embodiments, the trained machine learning module/model 222 includes a computer program code stored in a memory 208 and/or executed by the control circuit 206 to process one or more images 180, as described in more detail below.

It is noted that not all components illustrated in FIG. 2 are included in all embodiments of the motorized image capture device 120. That is, some components may be optional depending on the implementation of the motorized image capture device 120. It will be appreciated that while the image capture device 120 of FIG. 2 is a motorized robotic unit capable of moving about the product storage facility 105 while being controlled remotely (e.g., by the computing device 150) and without being controlled by an onboard human operator, in some embodiments, the image capture device 120 may be configured to permit an onboard human operator (i.e., driver) to direct the movement of the image capture device 120 about the product storage facility 105.

Figure 3:
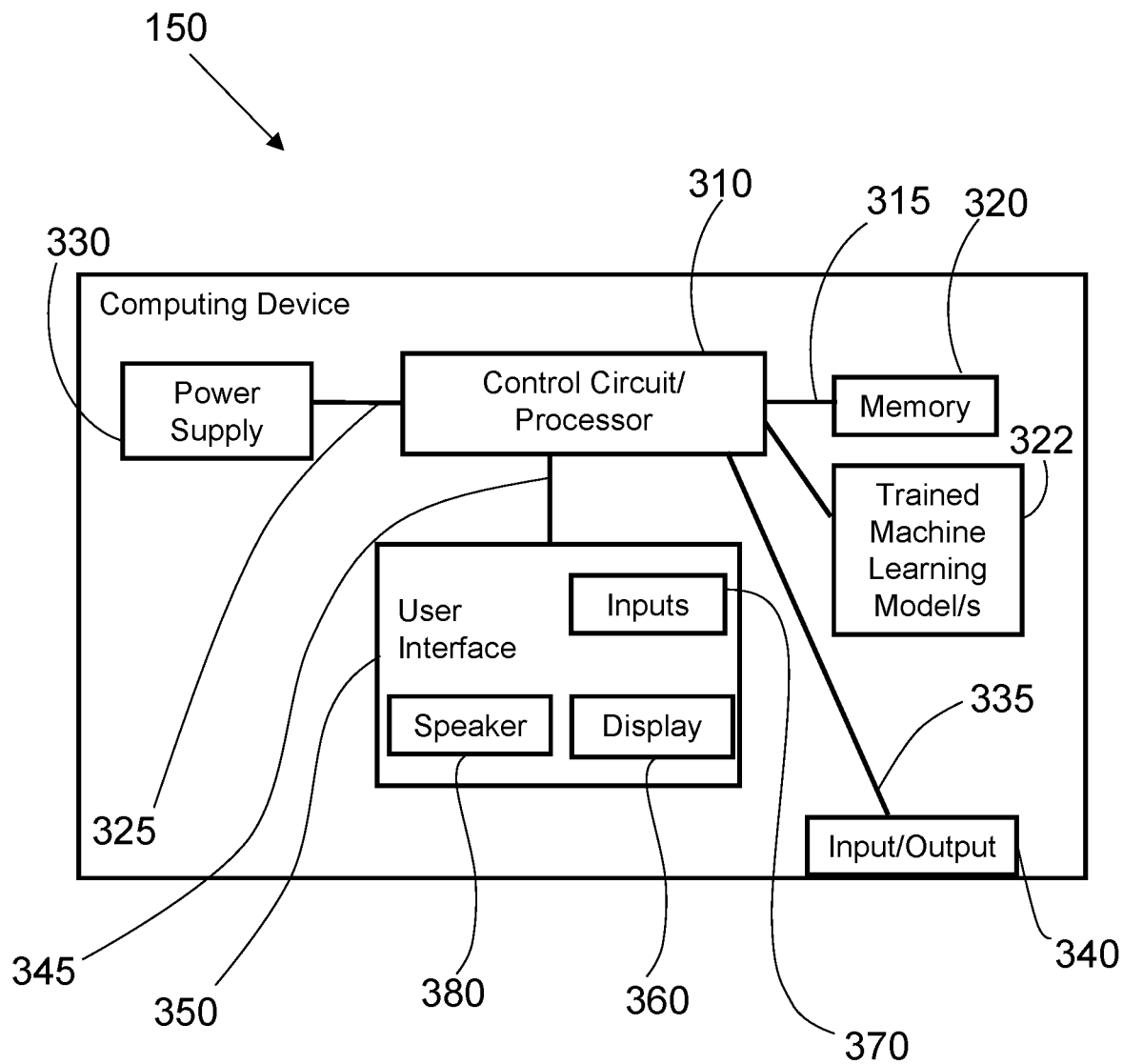
FIG. 3 is a functional block diagram of an exemplary computing device in accordance with some embodiments.

With reference to FIG. 3, the exemplary computing device 150 configured for use with exemplary systems and methods described herein may include a control circuit 310 including a programmable processor (e.g., a microprocessor or a microcontroller) electrically coupled via a connection 315 to a memory 320 and via a connection 325 to a power supply 330. The control circuit 310 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 310 can be configured (for example, by using corresponding programming stored in the memory 320 as will be well understood by those skilled in the art) to carry out one or more of the steps, actions, and/or functions described herein. In some embodiments, the memory 320 may be integral to the processor-based control circuit 310 or can be physically discrete (in whole or in part) from the control circuit 310 and is configured non-transitorily store the computer instructions that, when executed by the control circuit 310, cause the control circuit 310 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

Figure 4:
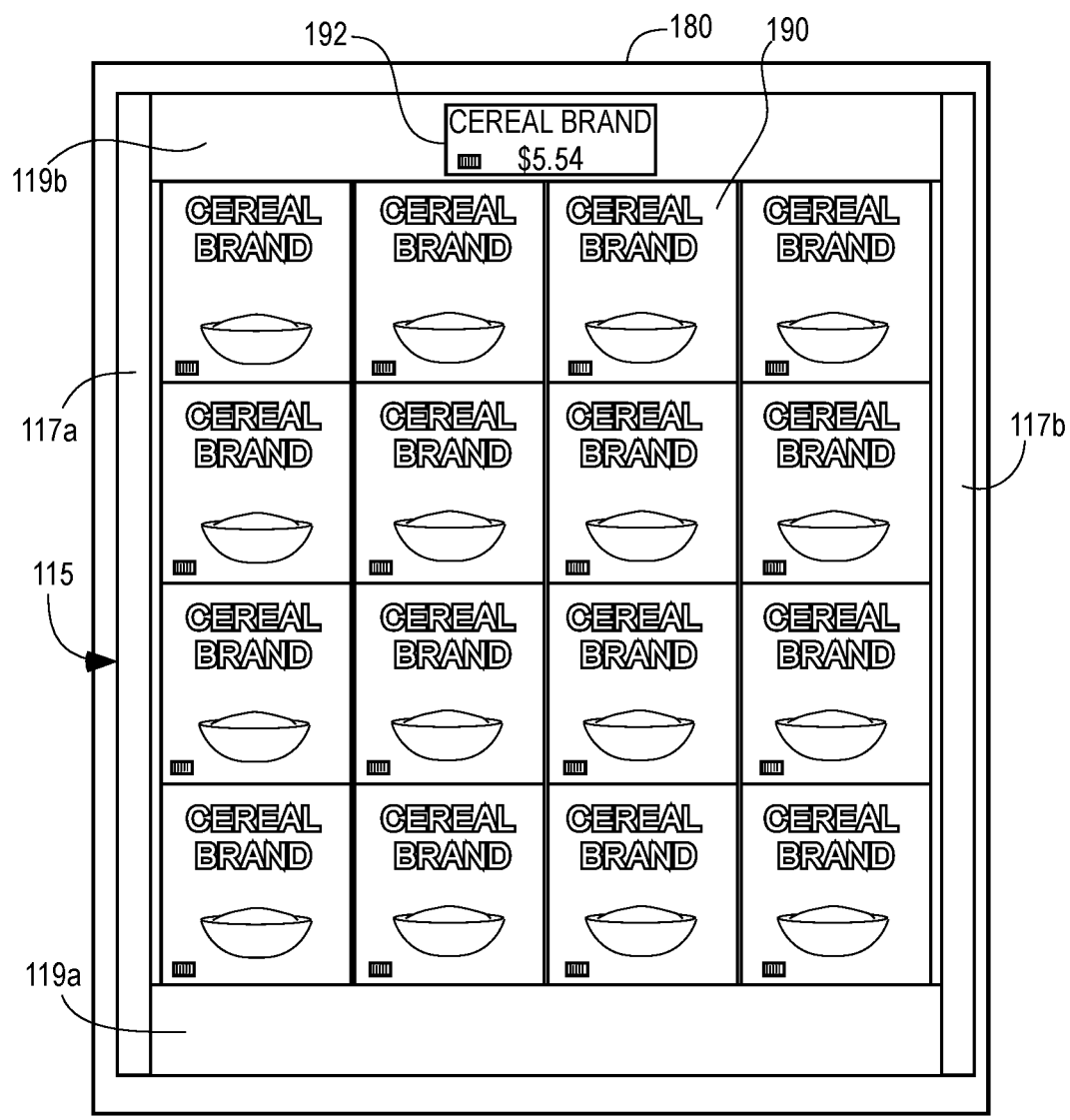
FIG. 4 is a diagram of an exemplary image of the product storage structure of FIG. 1 taken by the image capture device, showing the product storage structure of FIG. 1 and all of the products and price tag labels thereon.
Figure 5:
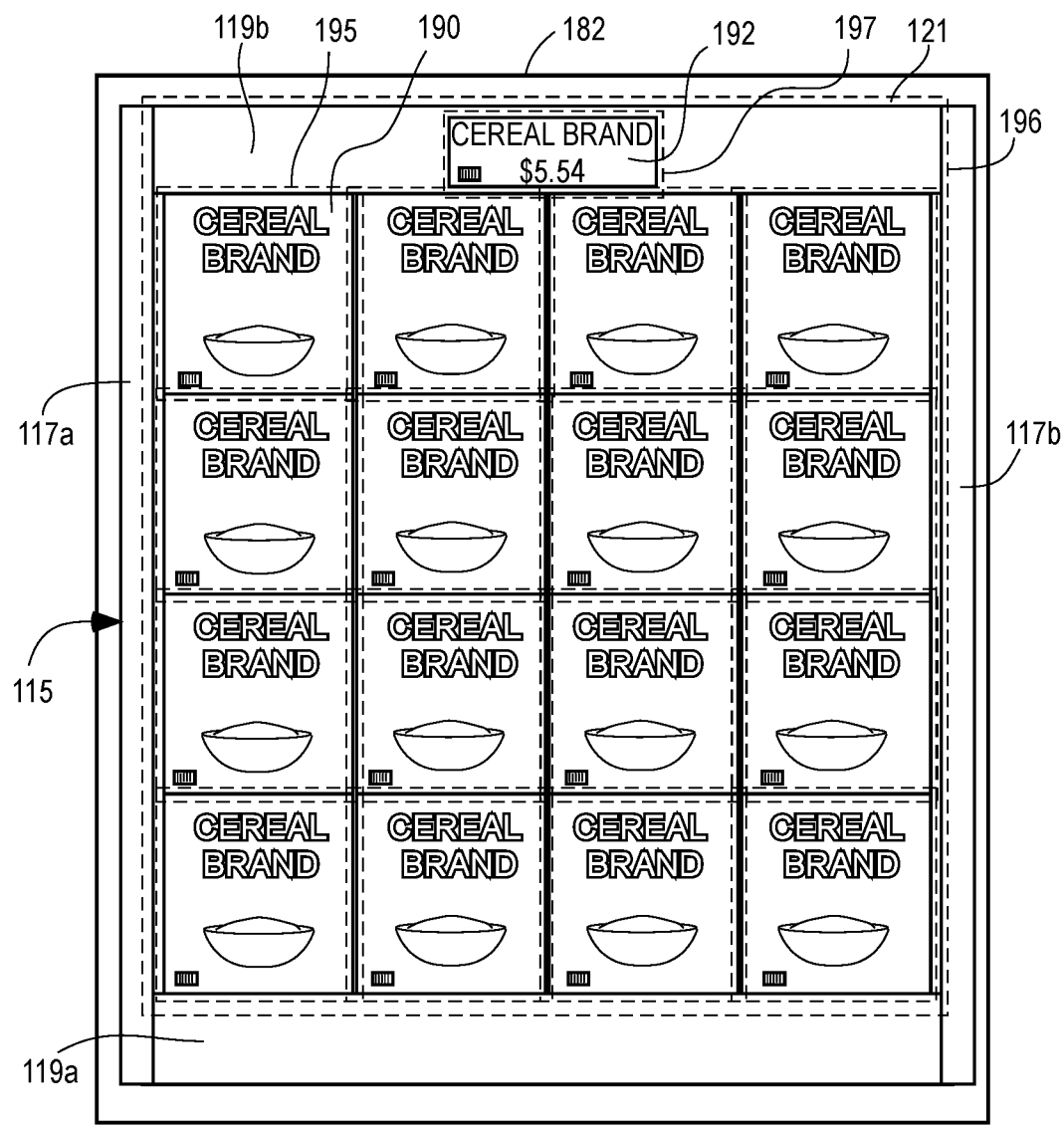
FIG. 5 is a diagram of the exemplary image of FIG. 4, after the image is processed to detect the individual products and the price tag label located on the product storage structure and to generate virtual boundary lines around each of the products and the price tag labels detected in the image.
Figure 6:
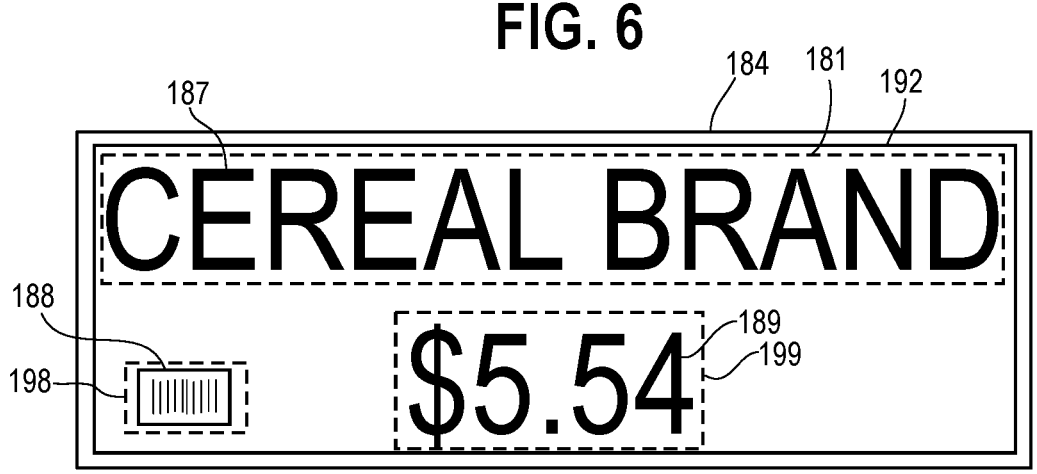
FIG. 6 is a diagram of an enlarged portion of the image of FIG. 5, after the image is processed to crop out the price tag label and to perform meta data extraction and optical character recognition of the price tag label.
Figure 7:
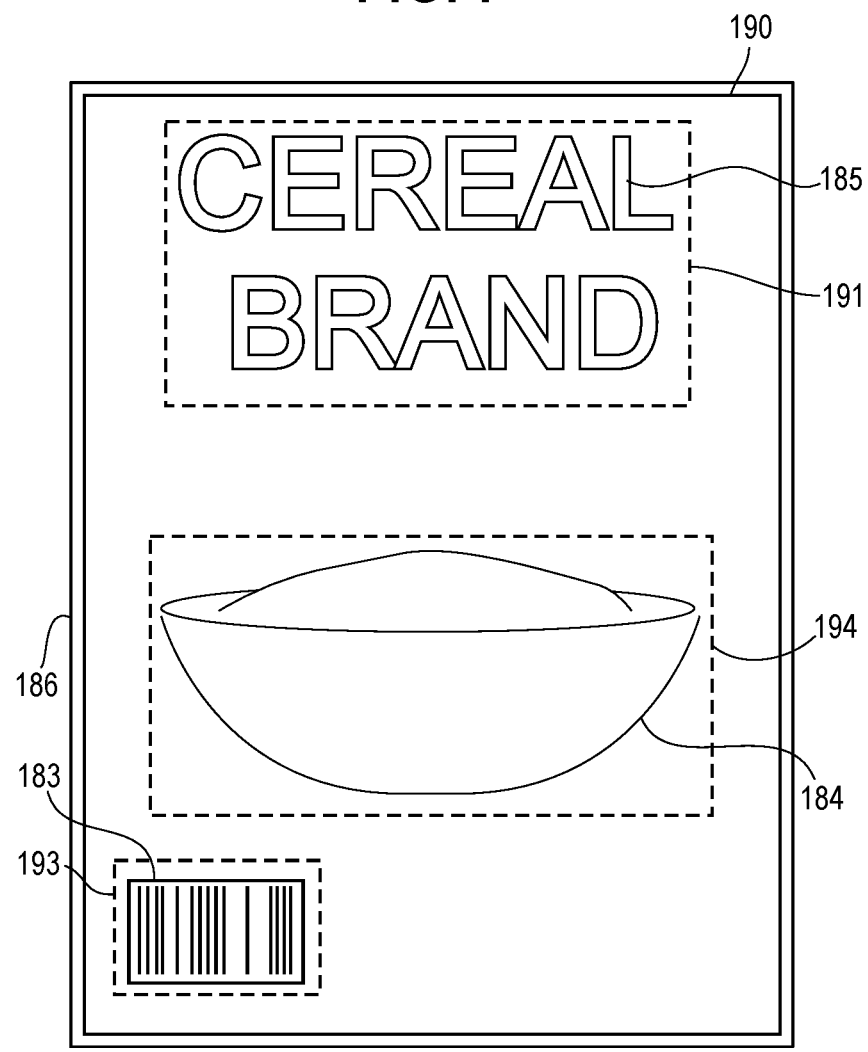
FIG. 7 is a diagram of an enlarged portion of the image of FIG. 5, after the image is processed to crop out an individual one of the products and to perform meta data extraction and optical character recognition of the product.

The control circuit 310 of the computing device 150 is also electrically coupled via a connection 335 to an input/output 340 that can receive signals from, for example, from the image capture device 120, the electronic database 140, internet-based service 170 (e.g., one or more of an image processing service, computer vision service, neural network service, etc.), and/or from another electronic device (e.g., an electronic device or user device 160 of a worker tasked with physically inspecting the product storage area 110 and/or the product storage structure 115 and observing the individual products 190 stocked thereon). The input/output 340 of the computing device 150 can also send signals to other devices, for example, a signal to the electronic database 140 including a raw image 180 of a product storage structure 115 as shown in FIG. 4, or a processed image 182 of the product storage structure 115 as shown in FIG. 5, or a cropped image 184 of the price tag label 192 as shown in FIG. 6, or a cropped image 186 of the product 190 as shown in FIG. 7. Also, a signal may be sent by the computing device 150 via the input/output 340 to the image capture device 120 to, e.g., provide a route of movement for the image capture device 120 through the product storage facility 105.

The processor-based control circuit 310 of the computing device 150 shown in FIG. 3 is electrically coupled via a connection 345 to a user interface 350, which may include a visual display or display screen 360 (e.g., LED screen) and/or button input 370 that provide the user interface 350 with the ability to permit an operator of the computing device 150 (e.g., worker at a the product storage facility 105 (or a worker at a remote regional center) tasked with monitoring the inventory and/or ensuring the product are correctly labeled at the product storage facility 105 to manually control the computing device 150 by inputting commands via touch-screen and/or button operation and/or voice commands. Possible commands may, for example, cause the computing device 150 to cause transmission of an alert signal to electronic mobile user device/s 160 of a worker/s at the product storage facility 105 to assign a task to the worker that requires the worker to, e.g., visually inspect and/or relabel a given product storage structure 115 based on analysis by the computing device 150 of the image 180 of the product storage structure 115 captured by the image capture device 120.

In some embodiments, the user interface 350 of the computing device 150 may also include a speaker 380 that provides audible feedback (e.g., alerts) to the operator of the computing device 150. It will be appreciated that the performance of such functions by the processor-based control circuit 310 of the computing device 150 is not dependent on a human operator, and that the control circuit 310 of the computing device 150 may be programmed to perform such functions without a human operator.

As pointed out above, in some embodiments, the image capture device 120 moves about the product storage facility 105 (while being controlled remotely by the computing device 150 (or another remote device such one or more user devices 160)), or while being controlled autonomously by the control circuit 206 of the image capture device 120), or while being manually driven or pushed by a worker of the product storage facility 105. When the image capture device 120 moves about the product storage area 110 as shown in FIG. 1, the sensor 214 of the image capture device 120, which may be one or more digital cameras, captures (in sequence and at predetermined intervals) multiple images of the product storage area 110 and the product storage structure 115 from various angles. In certain aspects, the image capture device 120 is configured to move about the product storage area 110 while capturing one or more images 180 of the product storage structure 115 at certain predetermined time intervals (e.g., every 1 second, 5 seconds, 10 seconds, etc.). The images 180 captured by the image capture device 120 may be transmitted to the electronic database 140 for storage and/or to the computing device 150 for processing by the control circuit 310 and/or to a web-/cloud-based image processing service 170.

In some aspects, the control circuit 310 of the computing device 150 obtains (e.g., from the electronic database 140, or from an image-processing internet-based service 170, or directly from the image capture device 120) one or more raw or processed images 180 of the product storage area 110 captured by the image capture device 120 while moving about the product storage area 110. In particular, in some aspects, the control circuit 310 of the computing device 150 is programmed to process a raw image 180 (captured by the image capture device 120 and obtained by the computing device 150 from the electronic database 140 or from the image capture device 120) to extract the raw image data and meta data from the image. In some aspects, the image 180 captured by the image capture device 120 may be processed via web-/cloud-based image processing service 170, which may be installed on the computing device 150 (or communicatively coupled to the computing device 150) and executed by the control circuit 310.

In some embodiments, the meta data extracted from the image 180 captured by the image capture device 120, when processed by the control circuit 310 of the computing device 150, enables the control circuit 310 of the computing device 150 to detect the physical location of the portion of the product storage area 110 and/or product storage structure 115 depicted in the image 180 and/or the physical locations and characteristics (e.g., size, shape, etc.) of the individual products 190 and the price tag labels 192 depicted in the image 180.

With reference to FIGS. 4 and 5, in some aspects, the control circuit 310 of the computing device 150 is configured to process the data extracted from the image 180 captured by the image capture device 120 to detect the overall size and shape of each of the individual products 190 located on the product storage structure 115 captured in the image 180. In some embodiments, the control circuit 310 is configured to process the data extracted from the image 180 and detect each of the individual products 190 and the price tag label 192 in the image 180 by executing one or more machine learning and/or computer vision modules and/or trained neural network modules/models 322. In certain aspects, the neural network executed by the control circuit 310 may be a deep convolutional neural network. The neural network module/model 322 may be trained using various data sets, including, but not limited to: raw image data extracted from the images 180 captured by the image capture device 120; meta data extracted from the images 180 captured by the image capture device 120; reference image data associated with reference images of various product storage structures 115 at the product storage facility 105; reference images of various products 190 stocked and/or sold at the product storage facility 105; reference images of various price tag labels 192 applied to the product structures 115 at the product storage facility 105; and planogram data associated with the product storage facility 105.

In some embodiments, the control circuit 310 may be trained to process one or more images 180 of product storage areas 110 at the product storage facility 105 to detect and/or recognize one or more products 190 using one or more computer vision/machine learning algorithms, including but not limited to Linear Regression, Logistic Regression, Decision Tree, SVM, Naïve Bayes, kNN, K-Means, Random Forest, Dimensionality Reduction Algorithms, and Gradient Boosting Algorithms. In some embodiments, the trained machine learning/neural network module/model 322 includes a computer program code stored in a memory 320 and/or executed by the control circuit 310 to process one or more images 180, as described herein. It will be appreciated that, in some embodiments, the control circuit 310 does not process the raw image 180 shown in FIG. 4 to result in the processed image 182 shown in FIG. 5, and that such processing is performed by an internet-based service 170, after which the processed image 182 is obtained by the control circuit 310 for further analysis.

In some aspects, the control circuit 310 is configured to process the data extracted from the image 180 via computer vision and one or more trained neural networks to detect each of the individual products 190 located on the product storage structure 115 in the image 180, and to generate virtual boundary lines 195 (as seen in image 182 in FIG. 5) around each one of the individual products 190 detected in the image 180. By the same token, in some aspects, the control circuit 310 is configured to process the data extracted from the image 180 via computer vision and one or more trained neural networks to detect the price tag label 192 located on the product storage structure 115 in the image 180, and to generate a virtual boundary line 197 (as seen in image 182 in FIG. 5) around the price tag label 192 detected in the image 180.

As seen in the image 182 in FIG. 5, the virtual boundary lines 195 extend about the outer edges of each of the individual products 190 located on the product storage structure 115, and form a perimeter around each of the individual products 190. Similarly, the virtual boundary lines 197 extend about the outer edges of the individual price tag label 192 located on the product storage structure 115, and form a perimeter around the price tag label 192. Generally, the control circuit 310 is programmed to interpret each of the virtual boundary lines 195 as surrounding only one individual product 190, to interpret the virtual boundary line 197 as surrounding only one individual price tag label 192.

In some embodiments, after generating the virtual boundary lines 195 around the products 190 and the virtual boundary lines 197 around the price tag label 192, the control circuit 310 of the computing device 150 is programmed to cause the computing device 150 to transmit a signal including the processed image 182 over the network 130 to the electronic database 140 for storage. In one aspect, this image 182 may be used by the control circuit 310 in subsequent image detection operations and/or training or retraining a neural network model as a reference model of a visual representation of the product storage structure 115 and/or products 190 and/or price tag labels 192. More specifically, in some implementations, the control circuit 310 is programmed to perform object detection analysis with respect to images subsequently captured by the image capture device 120 by utilizing machine learning/computer vision modules/models 322 that may include one or more neural network models trained using the image data stored in the electronic database 140. Notably, in certain aspects, the machine learning/neural network modules/models 322 may be retrained based on physical inspection of the product storage structure 115 and/or products 190 and/or price tag label 192 by a worker of the product storage facility 105, and in response to an input received from an electronic user device 160 of the worker.

In some embodiments, after the control circuit 310 processes the image 180 by the control circuit 310 of the computing device 150 to detect the individual products 190 within the image 180 and to generate virtual boundary lines 195 around each of the individual products 190, the control circuit 310 is programmed to define separate product storage spaces 121 of the product storage structure 115, and in the exemplary embodiment illustrated in FIG. 5, to define a product storage space 121 of the product storage structure 115 that contains the group of identical products 190 therein. In certain implementations, after the control circuit 310 of the computing device 150 detects the price tag label 192 located on the product storage structure 115 and define the product storage space 121 of the product storage structure 115 that stores individual units of an identical product 190 (e.g., cereal brand shown in FIG. 5), the control circuit 310 of the computing device is programmed to determine that the price tag label 192 is allocated to the product storage space 121 of the product storage structure 115 (i.e., located with the intention of identifying and indicating a price of the products 190). In one aspect, after the control circuit 310 determines that the price tag label 192 is positioned on the product storage structure 115 in association with the product storage space 121 containing the products 190, the control circuit 310 associates (e.g., by sending a signal to update the electronic database 140) the price tag label 192 with its respective product storage space 121 and with the products 190 stored in the product storage space 121.

In certain embodiments, as will be discussed in more detail below with reference to FIGS. 6-9, after the control circuit 310 determines that the price tag label 192 is positioned on the product storage structure 115 in association with the product storage space 121 containing the products 190, the control circuit 310 is programmed to extract one or more characters (which may be alphanumeric characters or special characters or images, etc.) from the price tag label 192 and from each of the products 190 detected in the image 180 captured by the image capture device 120, and correlates the characters extracted from the products 190 and the price tag label 192 to the inventory data stored in the electronic database 140 to identify a product code (e.g., a bar code, a universal product code, etc.) that matches the characters extracted from the price tag label 190 and to identify a product name that matches the characters extracted from the products 190, and determines whether the product code matching the characters extracted from the price tag label 190 presents a match to the product name matching the characters extracted from the products 190, thereby verifying whether the price tag label 192 is properly allocated on the product storage structure 115 to the products 190.

Figure 8:
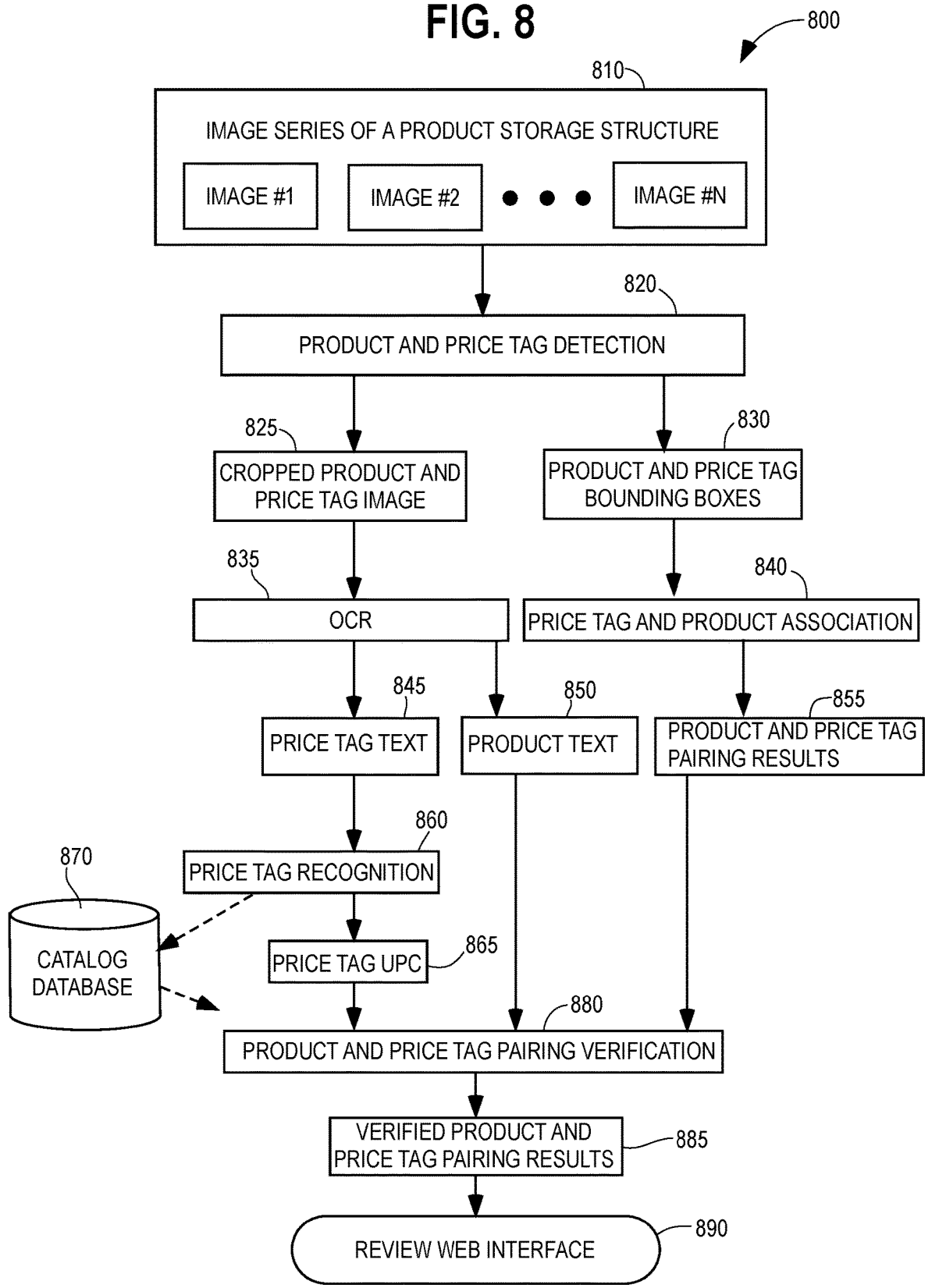
FIG. 8 is a flow diagram of an exemplary process of verifying price tag labels and on-shelf products at a product storage facility in accordance with some embodiments.

FIG. 8 shows exemplary logic flow of an exemplary method 800 of analyzing the pairings of price tag label 192 and products 190 on a product storage structure 115 at a product storage facility 105 via processing one or more digital images 180, 182 of the product storage structure 115. The method 800 includes obtaining, by the computing device 150, a series of images (e.g., Image #1, Image #2 . . . Image #N shown in FIG. 8) that include the image 180 (see FIG. 4) of the product storage structure 115 captured by the image capture device 120 during the movement of the image capture device 120 about the product storage facility 105 (step 810). As mentioned above, while this disclosure in FIG. 4 shows (for ease of illustration) only one image 180 of the product storage structure 115 and describes the analysis of this image 180 by the control circuit 310 of the computing device 150, it will be appreciated that, in some embodiments, the control circuit 310 may process and analyze dozens or hundreds of images of the product storage structure 115 (and, in some aspects, dozens or hundreds of other product storage structures 115 at the product storage facility 105) that are captured (at pre-determined intervals) by the image capture device 120 while moving about the product storage facility 105, and the images 180 may be processed by the control circuit 310 as raw images 180 or as processed images 182 (e.g., pre-processed by an image-processing and/or neural network-based internet-based service 170).

In the exemplary method 800, after the computing device 150 obtains the images of the product storage area 110 containing the product storage structure 115 obtained at step 810, the control circuit 310 processes the obtained image 180 to detect the products 190 and the price tag label 192 (step 820). To that end, in the embodiment illustrated in FIG. 8, the method 800 may include the control circuit 310 processing the obtained image 180 to generate a first set of virtual boundary lines 197 that surround the price tag label 192 and a second set of virtual boundary lines 195 each surrounding a respective one of the individual products 190 (step 830), thereby resulting an exemplary image 182 as shown in FIG. 5. Notably, the terms "virtual boundary lines" and "virtual bounding boxes" are used interchangeably herein.

In the embodiment illustrated in FIG. 8, after the image 180 obtained by the computing device 150 is processed by the control circuit 310 to generate the image 182 of FIG. 5 including virtual boundary boxes 195 around each of the individual products 190 and virtual boundary boxes 197 around the individual price tag label 192, the method 800 further includes the control circuit 310 processing the image 182 to align the above-referenced first set and second set of virtual bounding boxes 195 and 197 into a 2-dimensional space, and using a clustering algorithm to predict that the position of the virtual bounding box 197 representative of the price tag label 192, when analyzed in view of the position of the bounding boxes 195 representative of multiple identical units of one product 190 stored together in a single product storage space 121, is such that the price tag label 192 is most likely allocated to the product storage space 121 (step 840). As such, in the exemplary illustrated embodiment, as a result of the clustering of the virtual bounding boxes 195 and 197 in step 840, the control circuit 310 would determine that the product storage structure 115 captured in the image 182 of FIG. 5 contains one distinct product storage space 121 that contains individual units of one product 190 (i.e., a cereal box entitled "Cereal Brand"). In some aspects, after defining the product storage space 121 located in the image 182 of FIG. 6, the control circuit 310 of the computing device 150 generates a third set of virtual boundary lines 196 that surround the defined product storage space 121 containing the identical products 190.

With reference FIG. 8, in the exemplary process flow 800, after the control circuit 310 detects the individual price tag label 192 located on the product storage structure 115 and defines the individual product storage space 121 of the product storage structure 115 that stores identical products 190 therein, the control circuit 310 associates the price tag label 192 with (i.e., allocates the price tag label 192 to) the product storage space 121 and to the products 190 stored within the product storage space 121 (step 855). In one aspect, if the control circuit 310 determines in step 855 that the product storage space 121 of the product storage structure 115 does not have a price tag label 192 allocated thereto, the control circuit 310 generates a missing label alert and transmits the missing label alert over the network 130 (e.g., to the electronic database 140, to the user device 160, etc.). In one aspect, if the control circuit 310 determines in step 855 that the product storage space 121 has a price tag label 192 allocated thereto but no products 190 therein, the control circuit 310 generates an out of stock/replenishment alert and transmits this alert over the network 130 (e.g., to the electronic database 140, to the user device 160, etc.).

In some aspects, after correlating (i.e., pairing) the price tag label 192 with its respective product storage space 121, the control circuit 310 is programmed to cause the computing device 150 to transmit a signal including the image 182 and/or electronic data indicating the association of the price tag label 192 with the product storage space 121 and/or products 190 to the electronic database 140 for storage and future retrieval. In one aspect, this image 182 may be used by the control circuit 310 of the computing device 150 in subsequent image detection operations and/or training a neural network model as a reference model of a visual representation of the product storage structure 115 and/or products 190 and/or price tag label 192 and/or product storage area 121.

In some embodiments, after processing the image 180 shown in FIG. 4 to generate the virtual boundary lines 195 around the individual products 190 and the virtual boundary lines 197 around the price tag label 192 to result in an image 182 as shown in FIG. 5, the control circuit 310 of the computing device 150 further processes the image 182 (as will be described in more detail below with reference to FIGS. 6 and 7) to crop each individual product 190 from the image 182 and to crop the individual price tag label 192 from the image 182 (step 825), thereby resulting in images 184 (FIG. 6) and 186 (FIG. 7). Then, the control circuit 310 processes the individual price tag label 192 in the cropped image 184 and the individual product 190 in the cropped image 186 (e.g., via optical character recognition (OCR)) (step 835).

With reference to the exemplary price tag label 192 shown in FIG. 6, the meta data extracted from the price tag label 192 as a result of the OCR processing in step 835 may include alphanumeric characters, such as name 187 of the product 190 (e.g., "CEREAL BRAND"), price 189 of the product 190 (e.g., $5.54), and unique identifier 188 (e.g., bar code, etc.) of the product 190 (step 845). With reference to the exemplary product 190 shown in FIG. 7, the meta data extracted from the product 190 as a result of the OCR processing in step 835 may include alphanumeric characters, such as name 185 of the product 190 (e.g., "CEREAL BRAND"), a unique identifier 183 (e.g., bar code, etc.) of the product 190 and a general image 184 of the product 190 (e.g., a bowl with cereal in it, etc.) (step 850). In some embodiments, if the control circuit 310 is unable to perform OCR processing of the price tag label 192 in the image 182 (e.g., because the price tag label 192 in the image 182 is partially occluded), the control circuit 310 is programmed to generate an alert indicating that OCR processing of the price tag label 192 in the cropped image 182 was not successful.

As will be discussed in more detail below, in some embodiments, the control circuit 310 of the computing device 150 processes/analyzes the meta data extracted from the price tag label 192 to identify one or more alphanumeric characters (e.g., keywords, symbols, numbers, etc. as shown in the exemplary image 184 in FIG. 6), and determine a location of the detected alphanumeric characters on the price tag label 192 (step 860), which allows the control circuit 310 to predict (with high accuracy) the identity of the product 190 with which the price tag label 192 is associated. In the illustrated exemplary process 800, the control circuit 310 of the computing device 150 processes/analyzes the meta data extracted from the price tag label 192 to identify the product code (here, a bar code 188, which may represent the universal product code (UPC)) of the product 190 (step 865), which allows the control circuit 310 to identify the product 190 with which the price tag label 192 is associated. In one aspect, the control circuit 310 utilizes fuzzy matching (also referred to as approximate string matching) during step 860.

With reference to FIG. 6, after the control circuit 310 extracts the metadata (e.g., via OCR, see step 835) from the price tag label 192 and detects a keyword in the extracted meta data, the control circuit 310 converts the detected keyword to a keyword instance that indicates the keyword (i.e., each letter or number or character of the keyword) and the location of the keyword on the price tag label 192. For example, in the exemplary cropped image 184 of FIG. 6, the control circuit 310 detected the keyword "CEREAL BRAND" 187 (which indicates the brand name of the cereal product) on the price tag label 192 and generated a virtual bounding box 181 around the detected product brand name 187 on the price tag label 192. By the same token, the control circuit 310 detected the price 189 (i.e., $5.54) of the product 190 associated with the price tag label 192 and generated a virtual bounding box 199 around the detected product price 189 on the price tag label 192. In addition, the control circuit 310 detected the product code 188 (a UPC barcode in this example) of the product 190 associated with the price tag label 192 and generated a virtual bounding box 198 around the detected product code 188 on the price tag label 192.

Similarly, with reference to FIG. 7, after the control circuit 310 extracts the metadata (e.g., via OCR, see step 835) from the exterior of the product 190 (or from the exterior of the packaging of the product 190) and detects a keyword in the extracted meta data, the control circuit 310 converts the detected keyword to a keyword instance that indicates the keyword (i.e., each letter or number or character of the keyword) and the location of the keyword on the product 190. For example, in the exemplary cropped image 186 of FIG. 7, the control circuit 310 detected the keyword "CEREAL BRAND" 185 (which indicates the brand name of the cereal product) on the product 190 and generated a virtual bounding box 191 around the detected product brand name 185 on the product 190. By the same token, the control circuit 310 detected the non-alphanumeric graphical object 184 (i.e., an image of a bowl with cereal in it) on the product 190 and generated a virtual bounding box 194 around the detected graphical object 184 on the product 190. In addition, the control circuit 310 detected the product code 183 (a UPC barcode in this example) on the product 190 and generated a virtual bounding box 193 around the product code 183 detected on the product 190.

With reference back to FIG. 8, after the keywords/images on the product 190 and on the price tag label 192 are detected, the exemplary process flow 800 includes the control circuit 310 correlating the alphanumeric characters extracted from the price tag label 192 and/or product 190 detected in images 184 and/or 186 to the inventory data stored in the electronic database 140 (step 870), and performing a product 190 and price tag label 192 pairing verification to identify a product code (e.g., UPC code) and/or product name that matches the alphanumeric characters extracted from the price tag label 192 and product 190 (step 880). In one approach, the control circuit 310 may correlate the potential product identifiers (e.g., name 185/187 of product 190, UPC 183/188 of product 190, price 189 of product 190 etc.,) extracted from the product 190 and the price tag label 192, and querying the electronic database 140 to obtain the electronic catalog information indicating the known identifiers of reference products 190 stocked at the product storage facility 105 to determine which of the cropped images 184 and 186 receive high verification scores (which would be indicative of the product information on the price tag label 192 matching the product information stored in the product catalog in the electronic database 140 and/or the product information on the product 190 matching the product information stored in the product catalog in the electronic database 140).

For example, if the control circuit determines that the name 187 of the product 190 extracted from the price tag label 192 matches a name (e.g., "CEREAL BRAND", shown in FIG. 6) of a product listed in the product catalogue stored in the electronic database 140, and the price 189 (e.g., $5.54, shown in FIG. 6) extracted from the price tag label 192 associated with the product 190 matches the price (e.g., $5.54) listed in the product catalogue, then the control circuit would assign the image 184 of the price tag label 192 a high verification score. In another example, if the control circuit determines that the name 187 of the product 190 extracted from the price tag label 192 matches a name of a product listed in the product catalogue stored in the electronic database 140, but the price 189 (e.g., $5.54, shown in FIG. 6) extracted from the price tag label 192 does not match the price (e.g., $5.59) listed in the product catalogue, then the control circuit would assign the image 184 of the price tag label 192 a lower verification score than the verification score that would be assigned in the preceding example. By the same token, if the control circuit determines that the product code 183 of the product 190 extracted from the product 190 matches a product code listed in the product catalogue stored in the electronic database 140, then the control circuit would assign the image 186 of the product 190 a high verification score. On the other hand, if the control circuit determines that the product code 183 of the product 190 extracted from the product 190 does not match a product code listed in the product catalogue stored in the electronic database 140, then the control circuit would assign the image 186 of the product 190 a low verification score.

In some embodiments, the known product identifiers of reference products are generated based on processing of images of reference products 190 via keyword feature vector model classification and/or a web-/cloud-based services 170 and/or machine learning and computer vision modules/models 322 that may include one or more trained neural network models. In one aspect, the data representing the known product identifiers of reference products and the known keywords associated with such reference products is stored in the electronic database 140. In some aspects, after performing the verification of the price tag labels 192 and products 190 to the information stored in the electronic catalog database 140 in step 880, the control circuit 310 is programmed to cause the computing device 150 to transmit a signal including the cropped image 184 and/or 186 having a high verification score to the electronic database 140 for storage and future retrieval. In one aspect, these cropped images 184 and 186 may be used by the control circuit 310 of the computing device 150 in subsequent pairing of the products 190 and their respective price tag labels 192 and/or in training a neural network model as a reference model of a cropped image of a verified product 190 and/or a cropped image of a verified price tag label 192.

With reference to FIG. 8, in the exemplary method 800, if the control circuit 310 determines in the product 190 and price tag label 190 pairing verification step 880 that a certain catalogued product 190 stored in the electronic database 140 has a product code that matches the alphanumeric characters (e.g., product code 188) extracted from the price tag label 192 and also has a product name that matches the alphanumeric characters (e.g., product name 185) extracted from the product 190, the control circuit interprets this result as a verification that the price tag label 192 is properly allocated on the product storage structure 115 to the product 190 (step 885). In one aspect, based on a determination that a product catalog entry stored in the electronic database 140 contains a product code that matches the alphanumeric characters extracted from the cropped image 184 of the price tag label 192 in FIG. 6, and contains a product name that matches the alphanumeric characters extracted from the cropped image 186 of the product 190 in FIG. 6 (thereby supporting a verification that the price tag label 192 in the image 184 of FIG. 6 matches the product 190 in the image 186 of FIG. 7), the control circuit transmits a signal to the electronic database 140 to update the electronic database 140 to indicate that the price tag label 192 is properly allocated on the product storage structure 115 to the products 190.

On the other hand, if the control circuit 310 determines that a product catalog entry stored in the electronic database 140 contains a product name (e.g., "CEREAL BRAND") that matches the alphanumeric characters (i.e., "CEREAL BRAND" 187) extracted from the cropped image 184 of the price tag label 192 in FIG. 6 but contains a price (e.g., $5.99) that does not match the price 189 (e.g., $5.54, shown in FIG. 6) extracted from the cropped image 184 of the price tag label 192 (thereby supporting a determination that the price tag label 192 in the cropped image 184 of FIG. 6 does not match the product 190 in the cropped image 186 of FIG. 7), the control circuit 310 is configured to transmit a signal to the electronic database 140 to update the electronic database 140 to reflect that the price tag label 192 contains incorrect information.

In one implementation, if the control circuit 310 determines that the price tag label 192 depicted in the cropped image 184 contains incorrect information, the control circuit 310 transmits an incorrect label alert to a user device 160 of a worker of the product storage facility 105 to cause the user device 160 of the worker to display a notification including the incorrect label alert to the worker. In another implementation, if the control circuit 310 determines that the price tag label 192 contains incorrect information, the control circuit 310 transmits an incorrect label alert to the electronic database 140 to update the electronic database 140 such that the cropped image 184 stored in the electronic database 140 and depicting the price tag label 192 and being associated with the product 190 is labeled as a mis-labeled image.

In the embodiment illustrated in FIG. 8, after the control circuit 310 verifies the results of the pairing of the price tag label 192 to the products 190 in step 885, the exemplary method 800 includes the control circuit 310 generating a graphical interface, which may be displayed on a display of a user device 160 of a worker at the product storage facility 105, or on a display 360 of the computing device 150, and which enables a person viewing the graphical interface to quickly and easily review the status/results of the product labeling verification operations performed by the control circuit 310 (step 890). In some implementations, the graphical interface includes a status report indicating (i.e., displaying) the results of the processing of the images 180, 182, 184, and/or 186 by the control circuit 310. For example, the graphical interface generated on the computing device 150 and/or user device 160 may display a status report that includes electronic data including but not limited to: a total number of images 180 (e.g., 10,000) of product storage structures 115 at the product storage facility 105 processed by the control circuit 310 within a selected period of time (e.g., during the course of a specific day); a total number of the price tag labels 192 (e.g., 1000) detected on the product storage structures 115 in the images 180 processed by the control circuit 310; a total number of the price tag labels 192 (e.g., 968) detected on the product storage structures 115 that were determined by the control circuit 310 to be correctly associated with the products 190 stored on the product storage structures 115; and a total number of the price tag labels 192 (e.g., 32) detected on the product storage structures 115 that were determined by the control circuit 310 to be incorrectly associated with the products 190 stored on the product storage structures 115.

In certain embodiments, the graphical interface may also visually mark as incorrect the specific images 186 of the products 190 that are incorrectly labeled (i.e., incorrectly associated with the price tag label 192 allocated on the product storage structure 115 to the product storage space 121 assigned to the products 190). In other words, the auto-labeling review graphical interface described above provides a convenient and easy way for a worker at a product storage facility 105 to check whether the products 190 displayed on product storage structures 115 at the product storage facility 105 are labeled with appropriate price tag labels 192 and to quickly identify any mis-labeled products 190 and to take appropriate remedial action to properly label them.

Figure 9:
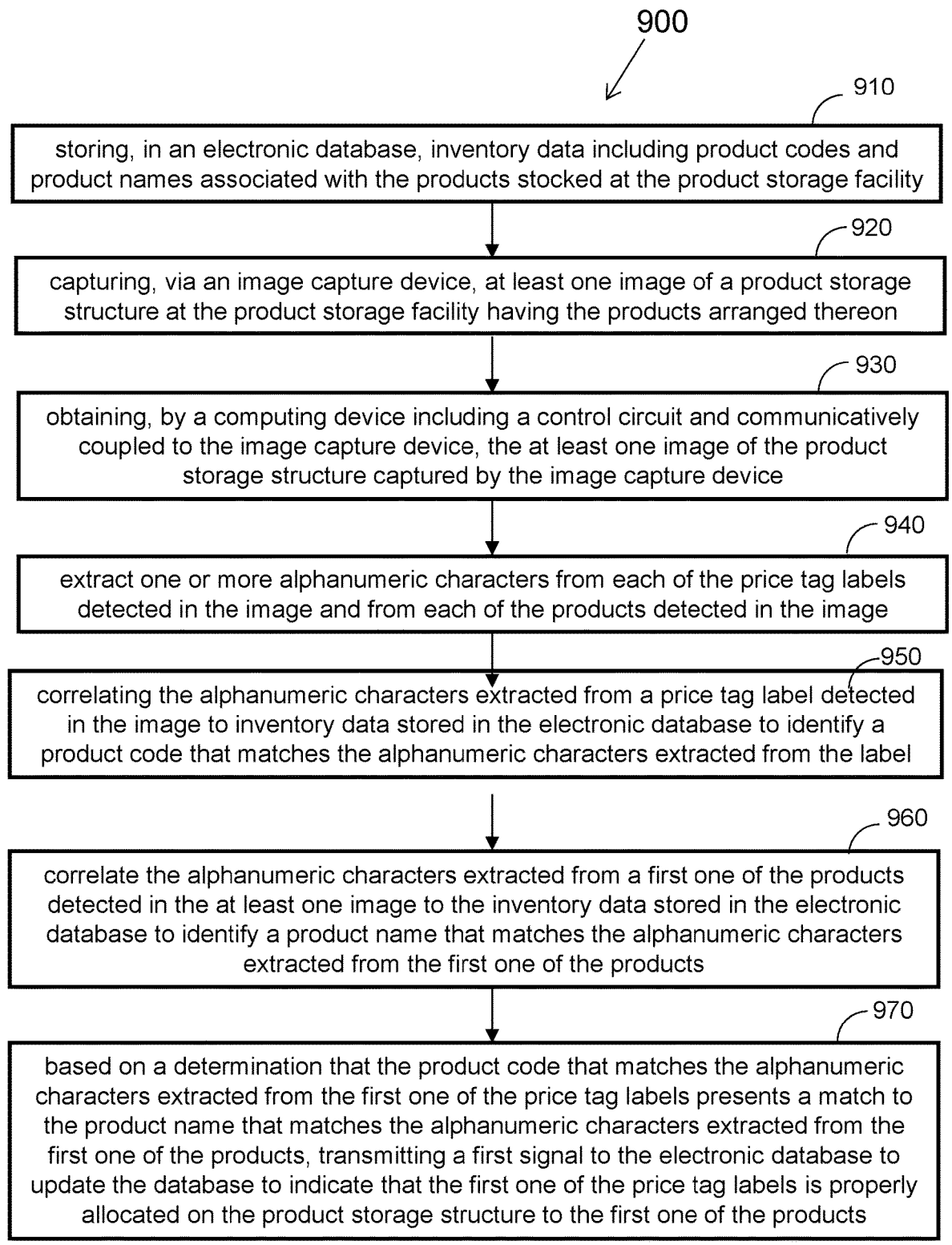
FIG. 9 is a flow diagram of another exemplary process of verifying pairings of price tag labels and on-shelf products at a product storage facility in accordance with some embodiments.

With reference to FIG. 9, an exemplary method 900 of operation of the system 100 for analyzing pairings of on-shelf price tag labels 192 and on-shelf products 190 at a product storage facility 105 is described. The method 900 includes storing, in an electronic database 140, inventory data including product codes (e.g., 183 and 188) and product names (e.g., 185 and 188) associated with the products 190 that are stocked at the product storage facility 190 (step 910). As pointed out above, the electronic database 140 of FIG. 1 may be configured as a single database, or a collection of multiple communicatively connected databases (e.g., digital image database, meta data database, inventory database, pricing database, customer database, vendor database, manufacturer database, etc.) and is configured to store various raw and processed images (e.g., 180, 182, 184, 186) of the product storage area 110 and product storage structure 115 (and price tag labels 192 and products 190 located thereon) captured by the image capture device 120 while the image capture device 120 is moving about the product storage facility 105.

In some aspects, the raw images 180 of the product storage structure 115, the processed images 182 of the product storage structure 115 that include virtual boundary lines around the products 190 and the price tag label 192, the cropped images 184 of individual price tag labels 192, and the cropped images of the individual products 190 may be retrieved from the electronic database 140 by the control circuit 310 of the computing device 150 and/or by the internet-based services 170 and used in subsequent operations involving image processing and object detection and/or training a neural network model as a reference model of a visual representation of the product storage structure 115 and/or products 190 and/or price tag label 192 and/or product storage area 121. As pointed out above, in some implementations, the electronic database 140 stores cropped images 184 of price tag labels 192 identified as having high verification scores and/or cropped images 186 of products 190 having high verification scores, which enables the control circuit 310 of the computing device 150 to efficiently perform the product-label verification and pairing when analyzing subsequent images 180 that depict price tag labels 192 and products 190 on a product storage structure 115 at a product storage facility 105.

With reference to FIG. 9, the exemplary method 900 includes capturing, via an image capture device 120, at least one image 180 of a product storage structure 115 at the product storage facility 105 having the products 190 arranged thereon (step 920). In some embodiments, the image capture device 120 moves about the product storage facility 105 (while being controlled remotely by the computing device 150 (or another remote device such one or more user devices 160)), or while being controlled autonomously by the control circuit 206 of the image capture device 120), or while being manually driven or pushed by a worker of the product storage facility 105. When the image capture device 120 moves about the product storage area 110 as shown in FIG. 1, the sensor 214 of the image capture device 120, which may be one or more digital cameras, captures (in sequence and at predetermined intervals) multiple images of the product storage area 110 and the product storage structure 115 from various angles. As pointed out above, the image capture device 120 may move about the product storage area 110 while capturing images 180 of the product storage structure 115 at certain predetermined time intervals (e.g., every 1 second, 5 seconds, 10 seconds, etc.), and the images 180 captured by the image capture device 120 may be transmitted to the electronic database 140 for storage and/or to the computing device 150 for processing by the control circuit 310 and/or to a web-/cloud-based image processing service 170.

The method 900 of FIG. 9 further includes several actions performed by a computing device 150 including a control circuit 310 and communicatively coupled to the image capture device 120. First, the method 900 includes obtaining at least one image 180 of the product storage structure 115 captured by the image capture device 120 (step 930). As pointed out above, the computing device 150 may obtain the image 180 directly from the image capture device 120 (e.g., over the network 130 via the wireless transceiver 212 of the image capture device and the input/output 340 of the computing device 150), or from the electronic database 140 (e.g., over the network 130 via the input/output 340 of the computing device over the network 130), or from an internet-based service 170 (which may process the image 180 as described above to result in the image 182 and/or processes the image 182 to result in the cropped image 184 and/or the cropped image 186, such that, in step 930, the computing device 150 does not obtain the raw image 180, but obtains the processed image 182, 184, and/or 186).

In the illustrated embodiment, after the control circuit 310 obtains the raw image 180, the method 900 further includes the control circuit 310 of the computing device 150 processing a raw image 180 (captured by the image capture device 120 and obtained by the computing device 150 from the electronic database 140 or from the image capture device 120) to extract the raw image data and meta data from the image 180 and, more particularly, extracting one or more alphanumeric characters from the individual products 190 and price tag label 192 (step 940). As pointed out above, alphanumeric characters that may be extracted (e.g., by OCR processing) from a cropped image 184 of a price tag label 192 as shown in FIG. 6 may include the name 187 of the product 190 (e.g., "CEREAL BRAND"), the price 189 of the product 190 (e.g., $5.54), and the unique identifier 188 (e.g., bar code, etc.) of the product 190. Similarly, the alphanumeric characters that may be extracted from a cropped image 186 of the product 190 may include the name 185 of the product 190 (e.g., "CEREAL BRAND") and a unique identifier 183 (e.g., bar code, etc.) of the product 190.

With reference to FIG. 9, after the control circuit 310 extracts the alphanumeric characters from the product 190 and the price tag label 192, the exemplary process flow 900 includes the control circuit 310 correlating the alphanumeric characters extracted from the price tag label 192 detected in the image 184 to the inventory data stored in the electronic database 140 to identify a product code (e.g., a UPC code or a retailer-specific unique identifier) of the product 190 (step 950) and correlating the alphanumeric characters extracted from the product 190 detected in the image 186 to the inventory data stored in the electronic database 140 to identify a product name (e.g., the brand name) of the product 190 (step 960).

In one approach, the control circuit 310 may correlate the potential product identifiers (e.g., name 185/187 of the product 190, UPC 183/188 of the product 190, price 189 of the product 190 etc.,) extracted from the product 190 and the price tag label 192, and querying the electronic database 140 to obtain the electronic catalog information indicating the known descriptions and identifiers of reference products 190 stocked at the product storage facility 105 to determine which of the cropped images 184 and 186 receive high verification scores. As pointed out above, the assignment of a high verification score to a cropped image 184 of a price tag label 192 would be indicative of the product information on the price tag label 192 closely (if not fully) matching the product information stored in the product catalog in the electronic database 140. By the same token, the assignment of a high verification score to a cropped image 186 of a product 190 would be indicative of the product information on the product 190 closely (if not fully) matching the product information stored in the product catalog in the electronic database 140.

With reference to FIG. 9, after the control circuit 310 determines that the product code that matches the alphanumeric characters (e.g., product code 188) extracted from the price tag label 192 presents a match to the product name that matches the alphanumeric characters (e.g., product name 185) extracted from the product 190, the method 900 further includes the control circuit 310 transmitting electronic data to the electronic database 140 to update the electronic database 140 to indicate that the price tag label 192 is properly allocated to the product 190 on the product storage structure 115 (step 970). On the other hand, if the control circuit 310 determines that the product code that matches the alphanumeric characters (e.g., product code 188) extracted from the price tag label 192 does not match the product name that matches the alphanumeric characters (e.g., product name 185) extracted from the product 190, the method 900 would include the control circuit 310 transmitting electronic data to the electronic database 140 to update the electronic database 140 to indicate that the price tag label 192 is not properly (i.e., erroneously) allocated to the product 190 on the product storage structure 115. For example, if the control circuit 310 determines that a product catalog entry stored in the electronic database 140 contains a product name (e.g., "CEREAL BRAND") that matches the alphanumeric characters (i.e., "CEREAL BRAND" 185) extracted from the cropped image 186 of the product 190 in FIG. 7, but contains a product code (e.g., UPC) that does not match the product code 188 (e.g., UPC) extracted from the cropped image 184 of the price tag label 192 (thereby supporting a determination that the price tag label 192 in the image 184 of FIG. 6 does not match the product 190 in the image 186 of FIG. 7), the control circuit 310 transmits a signal to the electronic database 140 to update the electronic database 140 to reflect that the price tag label 192 does not match the product 190.

The above-described exemplary embodiments advantageously provide for inventory management systems and methods, where the pairings of individual price tag labels and products located on the product storage structures of product storage facilities of a retailer can be efficiently verified (and corrected, if needed). As such, the systems and methods described herein provide for an efficient and precise verification of product-label pairs on product storage structures of a product storage facility and provide a significant cost savings to the product storage facility by saving the product storage facility thousands of worker hours that would be normally spent on manual on-hand product availability monitoring.

This application is related to the following applications, each of which is incorporated herein by reference in its entirety: entitled SYSTEMS AND METHODS OF SELECTING AN IMAGE FROM A GROUP OF IMAGES OF A RETAIL PRODUCT STORAGE AREA filed on Oct. 11, 2022, application Ser. No. 17/963,787; entitled SYSTEMS AND METHODS OF IDENTIFYING INDIVIDUAL RETAIL PRODUCTS IN A PRODUCT STORAGE AREA BASED ON AN IMAGE OF THE PRODUCT STORAGE AREA filed on Oct. 11, 2022, application Ser. No. 17/963,802; entitled CLUSTERING OF ITEMS WITH HETEROGENEOUS DATA POINTS filed on Oct. 11, 2022, application Ser. No. 17/963,903; entitled SYSTEMS AND METHODS OF TRANSFORMING IMAGE DATA TO PRODUCT STORAGE FACILITY LOCATION INFORMATION filed on Oct. 11, 2022, application Ser. No. 17/963,751; entitled SYSTEMS AND METHODS OF MAPPING AN INTERIOR SPACE OF A PRODUCT STORAGE FACILITY filed on Oct. 14, 2022, application Ser. No. 17/966,580; and entitled SYSTEMS AND METHODS OF DETECTING PRICE TAGS AND ASSOCIATING THE PRICE TAGS WITH PRODUCTS filed on Oct. 21, 2022, application Ser. No. 17/971,350.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for verifying pairings of on-shelf tag labels and products at a product storage facility, the system comprising:
  an electronic database configured to store inventory data for the product storage facility;
  a device configured for movement throughout the product storage facility;
  a single camera incorporated into the device, the single camera configured to capture a single image of a product storage structure in the product storage facility, wherein the single camera has a field of view that is wide enough to capture the entirety of the product storage structure in the single image, and wherein the product storage structure is a free-standing product display that is independent from other product storage structures in the product storage facility; and a computing device communicatively coupled to the single camera, the computing device configured to:

detect, in the single image, a price tag label affixed to the product storage structure and a product arranged on the product storage structure;

extract character(s) from the product in the single image and character(s) from the price tag label in the single image, wherein the character(s) extracted from the product are independent from a bar code on the product and the character(s) extracted from the price tag label are independent from a bar code on the price tag label;

determine, based on the character(s) extracted from the price tag label, a product code associated with the price tag label, the product code being identified without referencing the bar code on the price tag label;

determine, based on the character(s) extracted from the product, a keyword instance indicating both a keyword on the product and a specific location of the keyword on the product;

correlate the keyword instance with the inventory data stored in the electronic database to identify a product name associated with the product, the product name being identified without referencing the bar code on the product;

determine that the product name associated with the product matches the product code associated with the price tag label; and transmit, to the electronic database, a signal indicating that the price tag label is properly allocated to the product storage structure responsive to determining that the product name associated with the product matches the product code associated with the price tag label.

2. The system of claim 1, wherein the computing device is further configured to extract graphical object(s) from the product detected in the single image, the product name being identified by correlating both the graphical object(s) extracted from the product and the keyword instance with the inventory data stored in the electronic database.

3. The system of claim 2, wherein the graphical object(s) extracted from the product are independent from the bar code on the product.

4. The system of claim 2, wherein the graphical object(s) extracted from the product are independent from the character(s) extracted from the product.

5. The system of claim 2, wherein the computing device determines the keyword instance by generating a virtual boundary around the character(s) extracted from the product and performing optical character recognition within the virtual boundary to identify the keyword.

6. The system of claim 5, wherein the virtual boundary excludes the graphical object(s) extracted from the product and the bar code on the product.

7. A method for verifying pairings of on-shelf labels and products at a product storage facility, the method comprising:

capturing, via a single camera incorporated into a device configured for movement throughout the product storage facility, a single image of a product storage structure in the product storage facility, wherein the single camera has a field of view that is wide enough to capture the entirety of the product storage structure in the single image, and wherein the product storage structure is a free-standing product display that is independent from other product storage structures in the product storage facility;

detecting, in the single image, a price tag label affixed to the product storage structure and a product arranged on the product storage structure;

extracting character(s) from the product in the single image and character(s) from the price tag label in the single image, wherein the character(s) extracted from the product are independent from a bar code on the product and the character(s) extracted from the price tag label are independent from a bar code on the price tag label;

determining, based on the character(s) extracted from the price tag label, a product code associated with the price tag label, the product code being identified without referencing the bar code on the price tag label;

determining, based on the character(s) extracted from the product, a keyword instance indicating both a keyword on the product and a specific location of the keyword on the product;

correlating the keyword instance with inventory data stored in an electronic database to identify a product name associated with the product, the product name being identified without referencing the bar code on the product;

determining that the product name associated with the product matches the product code associated with the price tag label; and transmitting, to the electronic database, a signal indicating that the price tag label is properly allocated to the product storage structure responsive to determining that product name associated with the product matches the product code associated with the price tag label.

8. The method of claim 7, further comprising extracting graphical object(s) from the product detected in the single image, the product name being identified by correlating both the graphical object(s) extracted from the product and the keyword instance with the inventory data stored in the electronic database.

9. The method of claim 8, wherein the graphical object(s) extracted from the product are independent from the bar code on the product.

10. The method of claim 8, wherein the graphical object(s) extracted from the product are independent from the character(s) extracted from the product.

11. The method of claim 8, wherein determining the keyword instance comprises generating a virtual boundary around the character(s) extracted from the product and performing optical character recognition within the virtual boundary to identify the keyword.

12. The method of claim 11, wherein the virtual boundary excludes the graphical object(s) extracted from the product and the bar code on the product.

13. A method for verifying pairings of on-shelf labels and products at a product storage facility, the method comprising:

receiving a single image of a product storage structure in the product storage facility, the single image having been captured by a single camera having a field of view wide enough to capture the entirety of the product storage structure in the single image, wherein the single camera is incorporated into a device moving throughout the product storage facility, and wherein the product storage structure is a free-standing product display that is independent from other product storage structures in the product storage facility;

detecting, in the single image, a price tag label affixed to the product storage structure and a product arranged on the product storage structure;

extracting character(s) from the product in the single image and character(s) from the price tag label in the single image, wherein the character(s) extracted from the product are independent from a bar code on the product and the character(s) extracted from the price tag label are independent from a bar code on the price tag label;

determining, based on the character(s) extracted from the price tag label, a product code associated with the price tag label, the product code being identified without referencing the bar code on the price tag label;

determining, based on the character(s) extracted from the product, a keyword instance indicating both a keyword on the product and a specific location of the keyword on the product;

correlating the keyword instance with inventory data stored in an electronic database to identify a product name associated with the product, the product name being identified without referencing the bar code on the product;

determining that the product name associated with the product matches the product code associated with the price tag label; and transmitting, to the electronic database, a signal indicating that the price tag label is properly allocated to the product storage structure responsive to determining that the product name associated with the product matches the product code associated with the price tag label.

14. The method of claim 13, further comprising extracting graphical object(s) from the product detected in the single image, the product name being identified by correlating both the graphical object(s) extracted from the product and the keyword instance with the inventory data stored in the electronic database.

15. The method of claim 14, wherein the graphical object(s) extracted from the product are independent from the bar code on the product.

16. The method of claim 14, wherein the graphical object(s) extracted from the product are independent from the character(s) extracted from the product.

17. The method of claim 14, wherein determining the keyword instance comprises generating a virtual boundary around the character(s) extracted from the product and performing optical character recognition within the virtual boundary to identify the keyword.

18. The method of claim 17, wherein the virtual boundary excludes the graphical object(s) extracted from the product and the bar code on the product.

* * * * *